United States Patent [19]
Herron et al.

[11] Patent Number: 6,032,444
[45] Date of Patent: Mar. 7, 2000

[54] NON-ROW-SENSITIVE FORAGE HARVESTER

[75] Inventors: Maynard M. Herron; Howard J. Ratzlaff, both of Hesston; Ferol S. Fell, Newton, all of Kans.

[73] Assignee: Hay & Forage Industries, Hesston, Kans.

[21] Appl. No.: 08/868,710

[22] Filed: Jun. 4, 1997

[51] Int. Cl.[7] .................................................. A01D 45/02
[52] U.S. Cl. .................................. 56/60; 56/94; 56/102; 56/119; 56/503
[58] Field of Search .................................. 56/53, 60, 94, 56/95, 99, 100, 101, 102, 119, 98

[56] References Cited

U.S. PATENT DOCUMENTS

| | | |
|---|---|---|
| 2,836,026 | 5/1958 | Gray et al. . |
| 3,388,538 | 6/1968 | Markham . |
| 3,462,927 | 8/1969 | Quick . |
| 3,736,733 | 6/1973 | Fell et al. . |
| 3,866,399 | 2/1975 | Fell et al. . |
| 3,919,830 | 11/1975 | Gerber ................................. 56/119 X |
| 4,048,792 | 9/1977 | Shriver et al. . |
| 4,215,527 | 8/1980 | Shriver et al. . |
| 4,531,351 | 7/1985 | Sousek . |
| 4,594,842 | 6/1986 | Wolters et al. . |
| 5,040,362 | 8/1991 | Morgan et al. ......................... 56/98 X |
| 5,237,804 | 8/1993 | Bertling . |
| 5,546,737 | 8/1996 | Moosbrucker . |
| 5,651,243 | 7/1997 | Arnold et al. . |
| 5,722,225 | 3/1998 | Wuebbels et al. ........................... 56/60 |
| 5,845,472 | 12/1998 | Arnold ..................................... 56/94 |

FOREIGN PATENT DOCUMENTS

| | | |
|---|---|---|
| 0069898 | 6/1982 | European Pat. Off. . |
| 2369785 | 7/1978 | France . |
| 2612857 | 3/1976 | Germany . |
| 2900552 | 7/1979 | Germany . |
| 619708 | 4/1961 | Italy . |
| 2081565 | 2/1982 | United Kingdom . |

OTHER PUBLICATIONS

Kemper Brochure entitled "Champion–Rotary Crop Header" (publication date at least as early as Sep. 30, 1994).

Kemper Brochure entitled "Rotary Crop Header Row Independent Champion 3000" (Feb. 1988).

*Primary Examiner*—H. Shackelford
*Attorney, Agent, or Firm*—Hovey, Williams, Timmons & Collins

[57] ABSTRACT

A non-row-sensitive forage harvesting header for attachment to a mobile frame carrying a chopper has a pair of rotatable cutting discs for severing stalks as the frame moves across a field. Positioned above the cutting discs are a pair of drum-shaped transfer devices rotatable in opposite directions about upright axes coaxial with the rotational axes of the respective cutting discs for gathering severed stalks to a central location between the devices. A pair of endless gripping elements extend about respective ones of the transfer devices and present opposed rearwardly moveable runs extending between the central location and the chopper when the header is attached to the frame. The opposed runs of the gripping elements are operable to cooperatively grip each gathered stalk therebetween while moving the stalk rearwardly from the central location to the chopper. The header may be provided with rotatable auger cylinders positioned adjacent opposite sides of the chopper inlet when the header is attached to the mobile frame, with each cylinder having flighting for directing crop material downwardly toward the chopper inlet.

79 Claims, 7 Drawing Sheets

NON-ROW-SENSITIVE FORAGE HARVESTER

BACKGROUND OF THE INVENTION

1. Field of the Invention

The present invention relates generally to forage harvesters for harvesting and chopping stalky crop irrespective of crop row placement relative to the harvester as it moves across a field (i.e., a so-called "non-row-sensitive forage harvester"). More particularly, the present invention concerns improved structure for controlling the flow of severed stalks as the stalks move through the header and are presented to the chopping device.

2. Discussion of Prior Art

It is often desired to harvest stalky crop, such as corn, irrespective of the distance between the rows and the direction of the rows relative to the harvester as it moves across a field. Similarly, it is sometimes necessary to harvest randomly planted crop. Therefore, there are instances where row placement or harvesting conditions would prevent the use of a conventional row harvester having forwardly facing stalk inlets spaced at non-adjustable positions corresponding to a certain row spacing. For example, the rows of crop may be spaced too narrowly or widely apart to allow entry of the stalks into the spaced inlets of the conventional row header. This problem may occur when the farmer has planted crop at various row distances.

Accordingly, forage harvesters have been developed to harvest randomly planted crop or row crop irrespective of the distance between the rows and the direction of the rows relative to the harvester. Non-row-sensitive forage harvesters typically include a chopper for chopping severed stalks (a so-called "chopping box") and a harvesting header extending forwardly from the chopping box and defining a working width. The header includes at least one rotatable cutting disc for severing the crop across substantially the entire working width as the harvester moves across the field. Thus, all the crop located in front of the harvester, irrespective of row placement, is severed by the disc. A conventional non-row-sensitive header also includes at least one rotatable transfer device coaxial with the cutting disc, with the device serving to move stalks severed by the disc toward the chopping box. The transfer device often comprises a drum-shaped body having a plurality of circumferentially spaced fingers arranged in vertically spaced rows along its cylindrical periphery. Alternatively, the device may comprise a plurality of vertically spaced coaxial discs provided with a plurality of peripheral recesses for receiving the stalks.

In any case, conventional non-row-sensitive forage harvesters have problems with delivering the severed stalks to the chopping box. This problem is attributable in part to the fact that a path is defined between the transfer device and the chopping box in which stalk movement is uncontrolled and relatively disorganized. Particularly, conventional transfer devices disengage the severed stalks after moving the stalks to a location spaced from the chopping box. The stalks must consequently travel to the chopping box for some distance without being directly acted upon by the devices. It is believed that in a conventional non-row-sensitive harvester, the stalks are caused to flow along the uncontrolled path by their own momentum or the pressure exerted by inflowing, subsequently severed stalks. This is particularly troublesome since it is along the uncontrolled path that the severed stalks are pushed down into a generally horizontal orientation so that their butt ends are presented to the chopping box inlet.

The resulting disorganized flow of stalks toward the chopping box tends to clog the harvester and, in some cases, may jam or damage harvester components. The lack of control between the transfer device and chopping box may also result in the loss of crop. These problems are magnified in adverse harvesting conditions such as downed crops, entangled masses of stalks and undergrowth, variances in stalks sizes, heavy foliage and numerous or large ears on the stalks, tall stalks, etc. These problems are also more evident in high capacity harvesters having more than one transfer device and coaxial cutting disc.

Non-row-sensitive harvesters have been provided with rotatable conveyor drums positioned between the chopping box inlet and the transfer device for feeding the severed stalks to the chopping box. The conveyor drums rotate about an axis offset from vertical so as to angle upwardly from the transfer device for elevating the butt ends of the severed stalks to the chopping box inlet. However, the conveyor drums fail to positively control the movement of each severed stalk from the transfer device to the chopping box inlet, but rather simply exert a rearwardly directed force against the stalks. Additionally, such a configuration demands that the severed stalks be transferred from one drum to another as they move toward the chopping box, which is inherently troublesome.

Consequently, even harvesters utilizing conveyor drums still encounter problems with the movement of severed stalks between the transfer devices and the chopping box inlet which, as discussed above, may lead to clogging, jamming or damage to the harvester components. Further, because it is difficult to coordinate the throughput rates of the conveyor drums with the rates of the transfer devices, there is some risk that the transfer devices will overload the conveyor drums.

Other problems with conventional non-row-sensitive forage harvesters include wrapping of material, such as stalks or trash, around the transfer devices or conveyor drums. Although conventional harvesters have been provided with stationary elements for stripping material from the devices and conveyors, the stripping elements tend to collect material which may cause clogging or lock-up situations. These problems are magnified in wet crop conditions.

OBJECTS AND SUMMARY OF THE INVENTION

Responsive to these problems, an important object of the present invention is to provide an improved forage harvesting header which harvests and chops stalks irrespective of crop row placement relative to the harvester as it is advanced across the field. Along the same lines, an object of the present invention is to allow the operator to harvest crop placed at various row distances with a single header (i.e., without having to change headers).

Another object of the present invention is to provide a non-row-sensitive harvesting header with an apparatus for positively controlling the flow of each severed stalk between the transfer devices and the chopping box inlet. In this respect, an object of the present invention is to provide mechanism which assists the transfer devices with gathering the severed stalks and also feeds the stalks to the chopper so that the stalks need not be transferred from the devices to a conveyor drum. That is, the present invention provides mechanism for both gathering the severed stalks and feeding the stalks to the chopper so that the stalks are not released from control by the mechanism until they are delivered to the chopper.

A further object of the present invention is to provide a non-row-sensitive harvesting header with transfer devices that do not encounter the drum back-wrap problems associated with conventional headers. That is, it is an object of the present invention to provide means for positively stripping material from the drums for reducing the number of or eliminating the need for conventional stationary strippers. Particularly, the present invention provides an endless element wrapped about the transfer device and extending rearwardly toward the chopper for stripping stalks from the devices as the stalks are moved toward the chopper.

An additional object of the present invention is to provide a non-row-sensitive header which properly orients the severed stalks so that the butt ends are presented to the chopping box, whereby the risk of clogging and jamming of the feed rolls and damage to the feed rolls, is reduced.

Another object of the present invention is to provide an improved non-row-sensitive harvesting header which reduces the risk of crop loss while improving the flow of severed stalks between the transfer devices and the chopping box inlet. Further, the present invention provides means to grip each severed stalk as it is moved from the transfer device to the chopper, so as to pull the stalk free from any entangled masses, up off the ground, etc.

Yet another object of the present invention is to provide an apparatus for moving the severed stalks from the transfer devices to the chopping box, with the apparatus driving the transfer devices so as to coordinate the throughput rates of the devices and apparatus.

The present invention also addresses the problems associated with conventional "live corners" for facilitating the movement of crop material to the chopper. It will be appreciated that "live corners" typically comprise upright, rotatable elements provided just in front of and adjacent the lateral boundaries of the chopper inlet. The elements often include a ribbed outer surface and have an hourglass shape. The elements assist with feeding the upper portions of the stalks into the chopper inlet and present a live rotating surface that draws crop material laterally across the header and into the chopper inlet, which is especially helpful in downed crop conditions. However, conventional corner elements tend to collect trash and crop material thereon. Accordingly, it is an object of the present invention to provide improved live corner elements that are not prone to material back-wrap problems. Another object of the present invention is to provide a pair of auger members adjacent opposite sides of the chopper inlet, with each member having flighting for shifting loose crop material into engagement with the positively driven stalks.

In accordance with these and other objects evident from the following description of a preferred embodiment of the invention, the non-row-sensitive harvesting header includes an apparatus operable to grip each severed stalk while moving the stalk rearwardly from the central location to the chopping box. The gripping action of the apparatus positively controls the flow of severed stalks to the chopping box. Further, the apparatus serves to singulate the flow of severed stalks moving toward the chopping box. The present invention also contemplates providing a header with means for gathering the severed stalks to a location spaced from the chopper and means for feeding the stalks from the location to the chopper, with the gathering and feeding means sharing a common mechanism configured to move the severed stalks both to the location and to the chopper without releasing its control over the stalks until they reach the chopper. Similarly, the invention also contemplates providing a non-row-sensitive harvesting header with first and second pairs of opposed endless elements which move laterally across the front of the header toward a central location and rearwardly toward the chopper mechanism for both gathering and feeding the severed stalks without disengaging the stalks until they have reached the chopper.

The gripping apparatus preferably includes a pair of endless elements presenting opposed rearwardly moving runs extending between the central location and the chopping box for gripping each stalk therebetween. The illustrated transfer devices each comprise a drum-shaped body having a generally cylindrical periphery and a plurality of circumferentially spaced fingers projecting outwardly from the periphery. With this embodiment, each gripping element extends about the periphery of a respective one of the transfer devices. Additionally, the preferred transfer devices include a circumferential sprocket, and each gripping element comprises a chain entraining the sprocket of the corresponding transfer device. Driving power is supplied to the chains such that the gripping elements impart rotational movement to the transfer devices.

The preferred harvesting header includes a conveyor operable to engage the stalks at a point spaced vertically from the gripping elements for assisting with rearward movement of the stalks from the central location to the chopping box. The conveyor comprises a pair of endless conveying elements presenting opposed rearwardly moving runs extending between the central location and the chopping box, with each element preferably comprising a chain carrying a plurality of spaced crop-engaging prongs, if so desired. The conveying elements also extend about the periphery of respective ones of the transfer devices. The gripping elements are positioned to grip the stalks adjacent the severed ends thereof, while the conveying elements are spaced upwardly from the gripping elements.

The invention also concerns a harvesting header having auger members rotatable about laterally spaced, upright axes adjacent opposite sides of the chopper inlet, wherein each of the members have flighting for directing the stalks toward the chopper inlet. The auger members may be employed in a row or non-row-sensitive harvesting header.

BRIEF DESCRIPTION OF THE DRAWING FIGURES

A preferred embodiment of the invention is described in detail below with reference to the attached drawing figures, wherein:

FIG. 7 is a fragmentary top plan view of the opposed runs of the gripping elements, particularly illustrating severed stalks gripped between the elements;

DETAILED DESCRIPTION OF THE PREFERRED EMBODIMENTS

Figure 1:
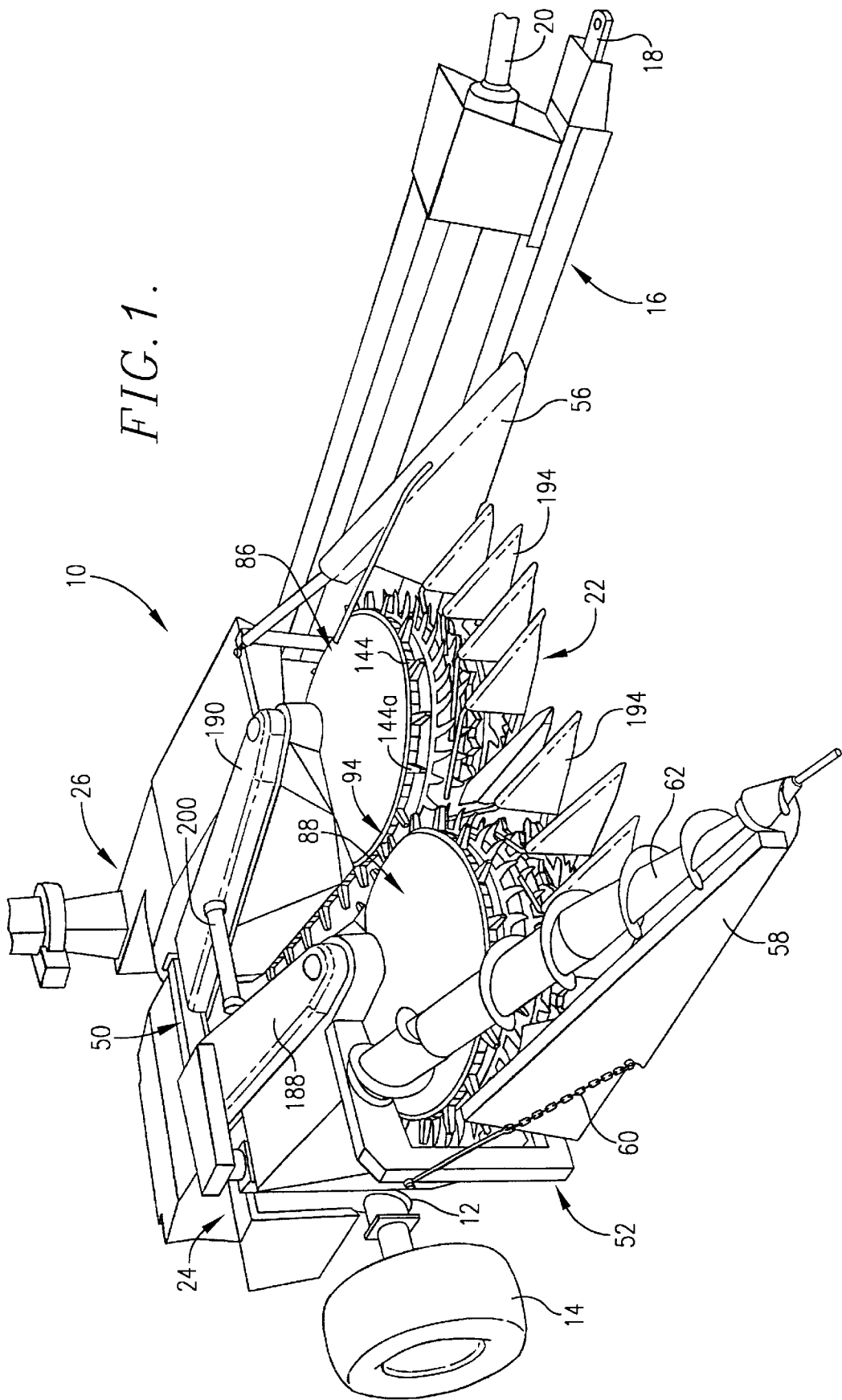
FIG. 1 is a perspective view of a non-row-sensitive forage harvester constructed in accordance with the principles of the present invention.

Turning now to FIG. 1, the non-row-sensitive forage harvester 10 selected for illustration includes a mobile frame or chassis 12 supported on ground wheels 14 (only the right ground wheel being shown in FIG. 1). A tongue 16 extending forwardly from the left side of the chassis 12 includes a hitch 18 adapted for connection with a towing vehicle (not shown), and a drive shaft 20 connectable to the PTO of the towing vehicle for providing power to the various harvester components. The chassis 12 carries a forwardly projecting harvesting header 22 for severing the stalks and delivering the severed stalks rearwardly to a chopper 24 which in turn chops the severed stalks into desired sizes. A blower 26 spaced laterally on the chassis 12 from the chopper 24 transfers the chopped sections of crop to a remote location such as a wagon or trailer (not shown).

The chopper 24 and blower 26 have generally conventional constructions and therefore are not described or illustrated in detail. Suffice it to explain that the illustrated chopper 24 is a traditional chopping box having a forwardly facing inlet 28 defined generally by a pair of vertically spaced feed rolls 30 and 32 (see FIG. 4). As will subsequently be described, the header 22 is designed to direct the severed stalks butt end first to the feed rolls 30,32 which in turn draw the stalks into the chopping box 24. The severed stalks move rearwardly through a pair of secondary feed rolls 34 and 36 and ultimately to a cutting cylinder 38. The cutting cylinder 38 has a plurality of circumferentially spaced blades 40 attached thereto for chopping the rearwardly moving stalks into small segments of predetermined length. If desired, the speed of the feed rolls 30,32,34,36 may be varied for adjusting the length of the chopped sections.

Figure 4:
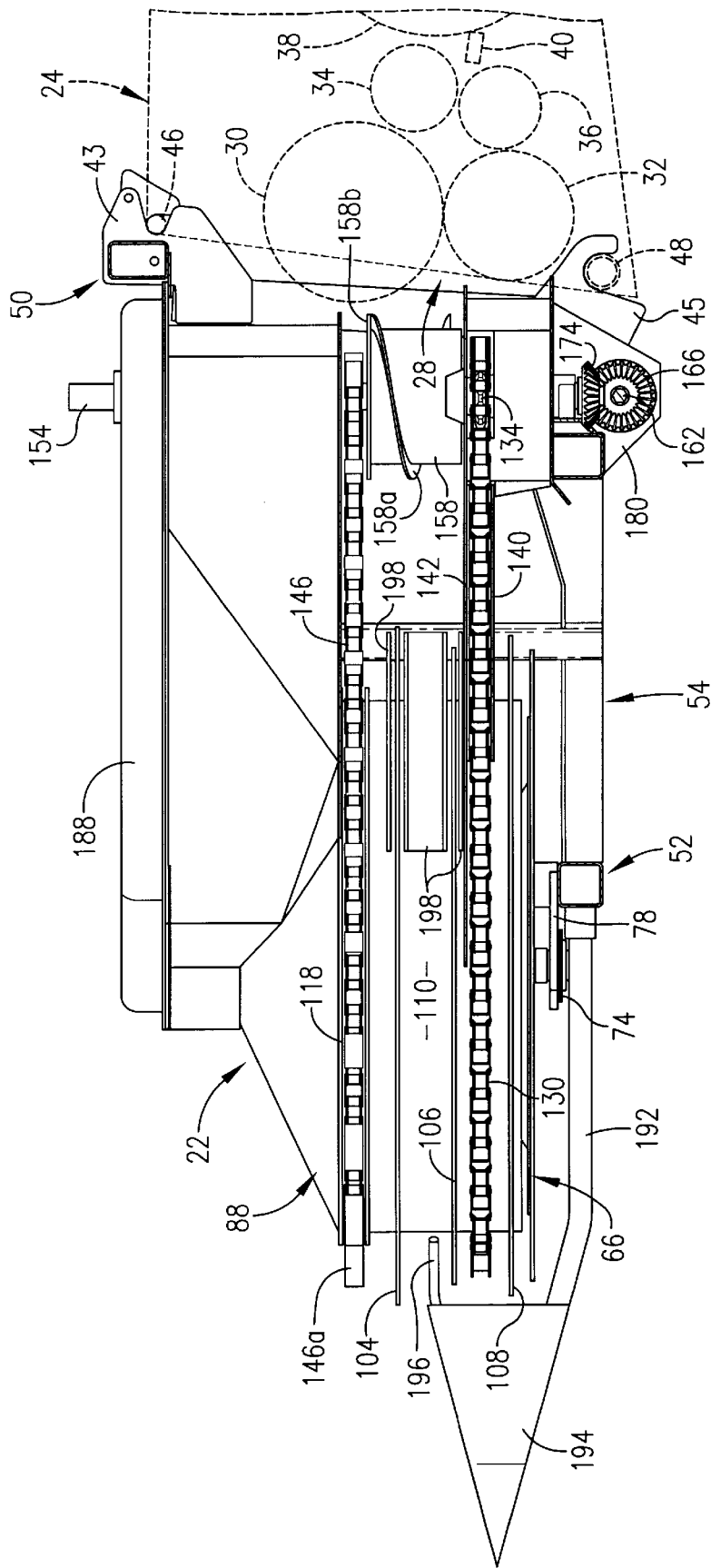
FIG. 4 is a vertical sectional view of the header and a portion of the chopping box taken generally along the fore-and-aft centerline of the harvester, particularly illustrating the location of the gripping and conveying elements relative to the inlet of the chopping box.

The header 22 preferably constitutes a composite unit detachably mounted in any conventional manner to the chassis 12 for swinging movement about a horizontal axis. As shown in FIG. 4, the illustrated header 22 includes a pair of latches 42,43 and a downwardly spaced pair of hook-type brackets 44,45 releasably fastened to transverse mounting posts 46 and 48, respectively, fixed to the chassis 12. The latches 42,43 and brackets 44,45 are bolted or otherwise attached to a mounting subframe 50 of the header which in turn supports the remaining header framework, including a forwardly spaced box subframe 52 and a bottom subframe 54 extending between the mounting subframe 50 and the box subframe 52 (e.g., see FIG. 5). The angle of the chopping box 24 relative to the chassis 12 may be varied by suitable means, such as a hydraulic cylinder (not shown) connected between the chassis and chopping box, for adjusting the tilt of the header 22. Although the header 22 is shown attached to a pull-type frame 12, those ordinarily skilled in the far machinery industry will appreciate that the principals of the present invention are equally applicable to a self-propelled frame or prime mover (not shown) carrying the header. In fact, the latches 42,43 and hook-type brackets 44,45 constitute universal mounting structure so that the illustrated header may be removed from the pull-type frame 12 and installed on a prime mover.

Figure 2:
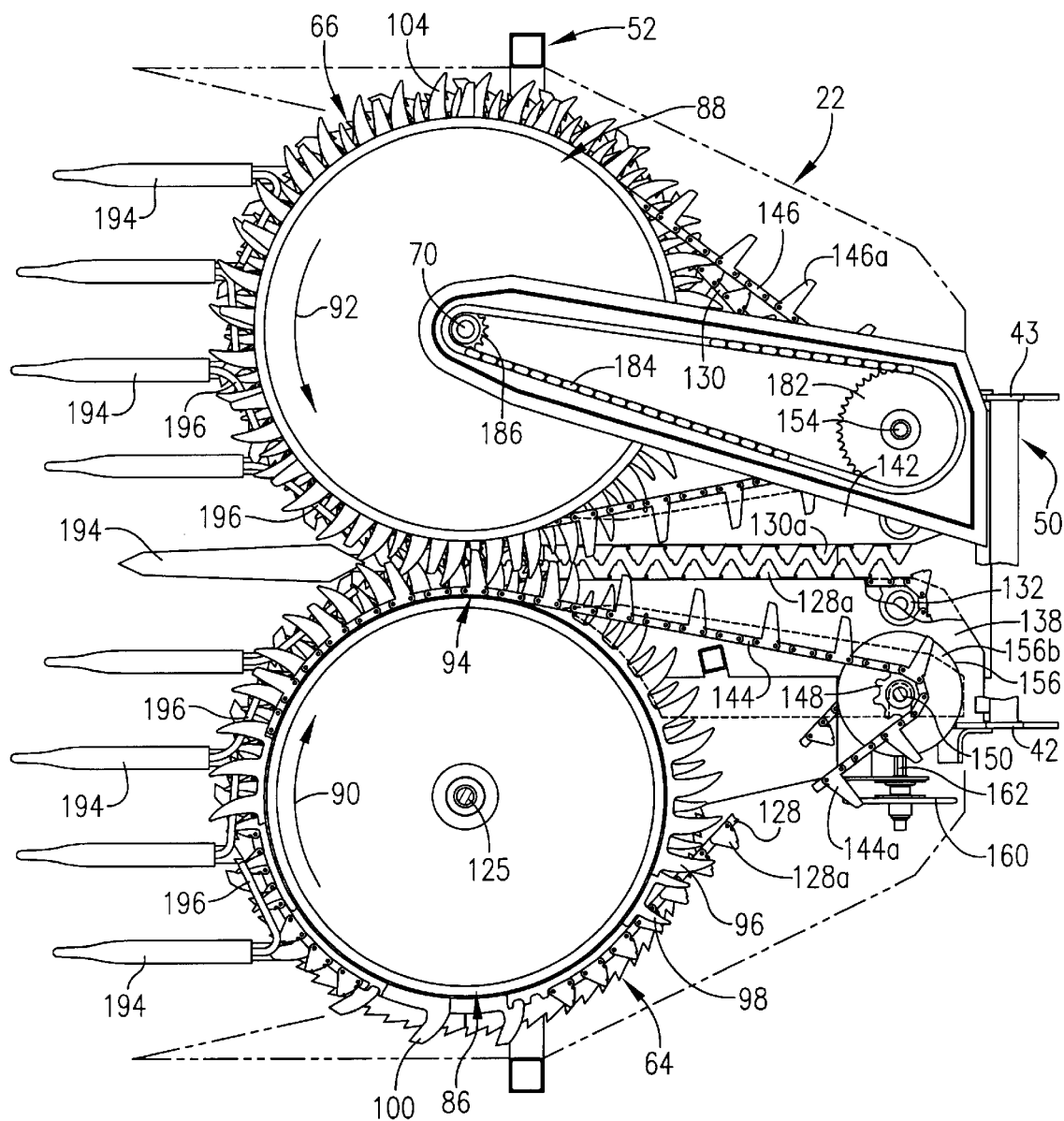
FIG. 2 is a top plan view of the header illustrated in FIG. 1 with parts being broken away to show the chain drive for the fight cutting disc and the rear sprockets entrained by the left gripping element and left conveying element.
Figure 3:
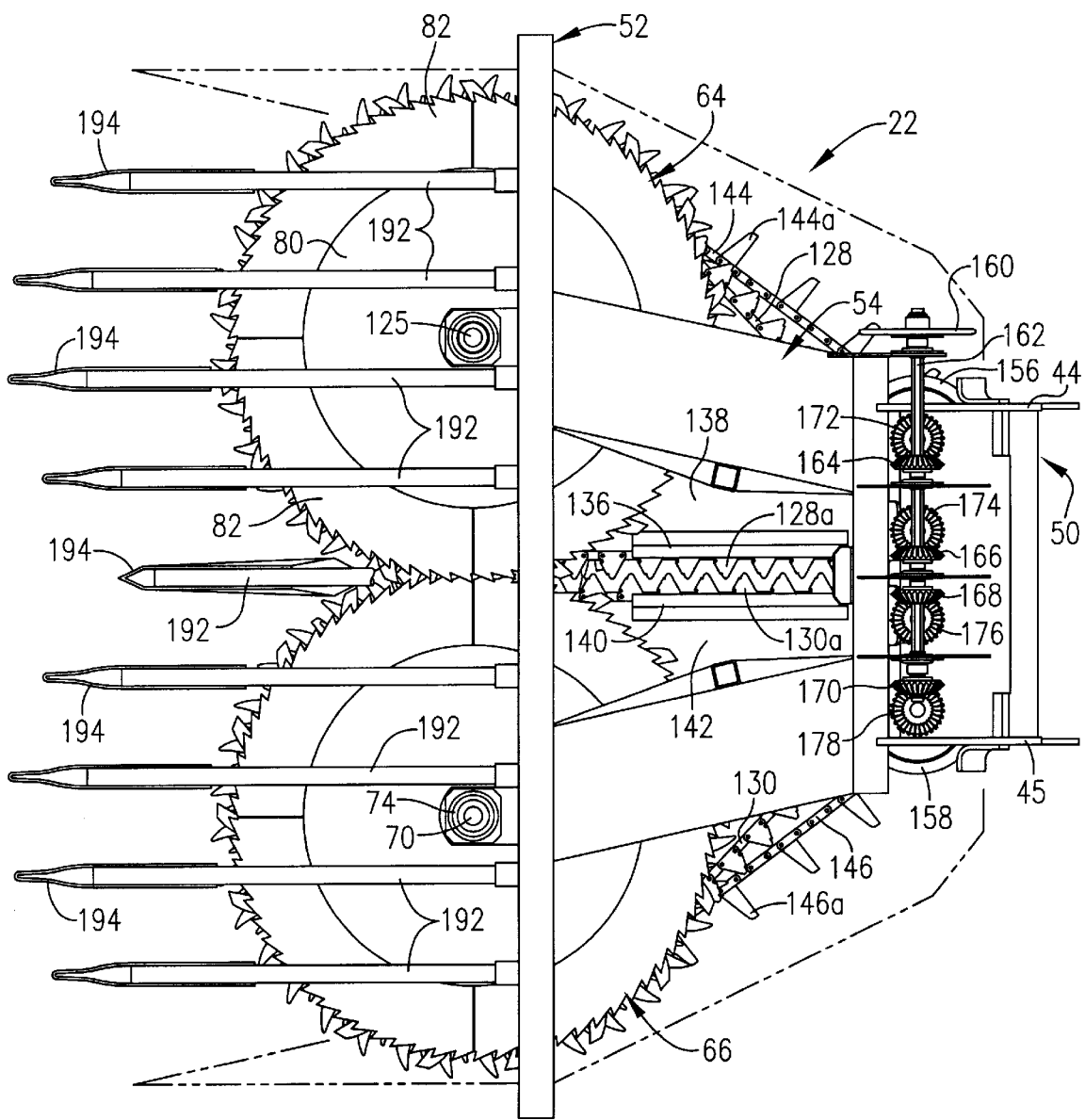
FIG. 3 is a bottom plan view of the header, particularly illustrating the gear transmission of the header.

A pair of outer triangular-shaped guides 56 and 58 project forwardly from the box subframe 52 to define a working width of the harvester 10 (see FIGS. 1–3). Particularly, the forwardmost tips of the guides 56 and 58 define the lateral boundaries of the header 22 as the harvester is advanced across a field. As will subsequently be described, all crop stalks located between the lateral boundaries of the header 22 (i.e., located between outer guides 56 and 58) will be harvested irrespective of the placement of the stalks relative to the header. The guides 56 and 58 are mounted to the subframe 52 by an adjustable chainlink assembly 60 (only one such assembly being shown in FIG. 1) for allowing adjustment of the height of the tips relative to the ground. It will be appreciated that in various crop conditions, such as entangled, downed or wet crop, the tips of the guides 56 and 58 must be placed relatively close to the ground for separating crop located on opposite sides of the guides; that is, the guides 56 and 58 must be positioned for preventing crop located outside the guides from being pulled inwardly by the harvesting components. Furthermore, a rotatable auger screw 62 extends generally along the right guide 58 and slightly beyond the forwardmost tip of the guide 58 for facilitating untangling of crop along the right side of the harvester. Of course, only one auger screw is required as long as the right side of the harvester is always placed along the uncut crop. The auger screw 62 also serves to lift downed crop along the right side of the harvester.

The illustrated header 22 includes a pair of laterally spaced, rotatable cutting discs 64 and 66 positioned forwardly of the chopping box 24 for severing the stalks very near to the ground. As perhaps best shown in FIG. 3, the discs 64,66 collectively extend across substantially the entire working width of the harvester 10. Although there are small gaps defined between the outer limits of the discs 64,66 and the guides 56,58, stalks within these spaces are transferred inwardly and eventually severed by the discs. The left disc 64 is positioned slightly lower than the right disc 66 such that the discs overlap (see FIG. 6) for ensuring severance of stalks in the relatively congested center of the harvester. Furthermore, the slight overlap provides a wiping relationship for the cutting discs 64,66 so as to remove debris or crop material clinging to the discs, which is particularly advantageous in wet crop conditions. Although the illustrated embodiment employs a pair of cutting discs, various other cutters may be used such as a sickle bar or a cutter bed having a plurality of laterally spaced rotary cutting blades.

Figure 5:
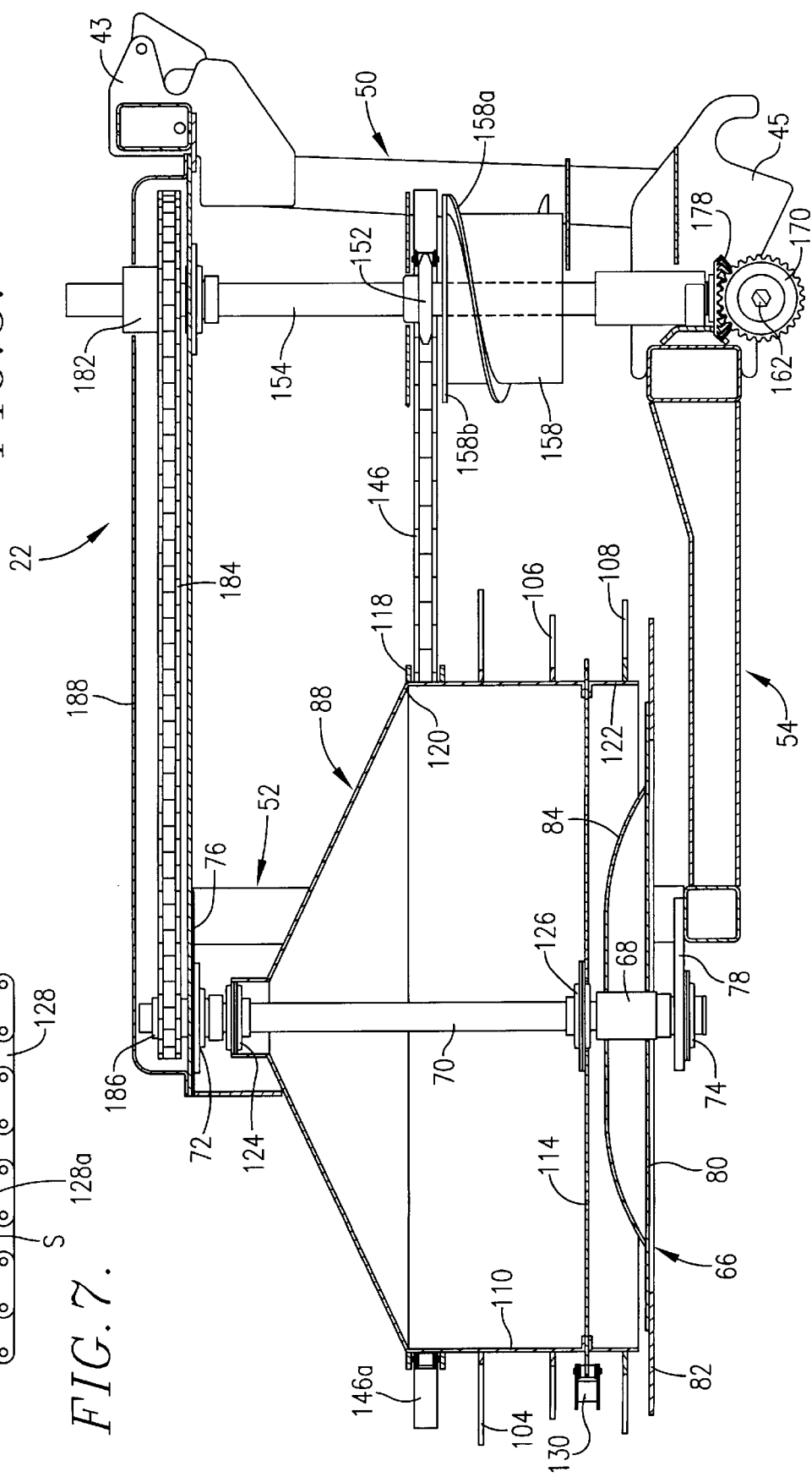
FIG. 5 is a vertical sectional view of the header taken through one of the transfer devices, particularly illustrating the drive for the cutting discs.

The cutting discs 64 and 66 are nearly identical in construction, and accordingly, the constructional details of only one of the discs are described herein with the understanding that the other disc includes like components. As shown in FIG. 5, the right cutting disc 66 includes a hub 68 secured to an upright shaft 70 for rotational movement therewith. A pair of bearing assemblies 72 and 74 journal the shaft 70 for rotation on upper and lower support plates 76 and 78 fixed to the header framework. Projecting radially from the hub 68 is a cylindrical plate 80 carrying four arcuate blade elements 82 which form a continuous serrated ring about the plate (see also FIG. 3). Returning to FIG. 5, a dome-shaped support member 84 connects between the hub 68 and cylindrical plate 80 to add rigidity to the cutting disc.

Positioned above the cutting discs 64 and 66 are a pair of laterally spaced transfer drums 86 and 88 for moving the stalks severed by the discs toward the chopping box 24. The illustrated drums 86 and 88 are driven in opposite directions, as indicated by arrows 90 and 92 in FIG. 2, to gather the severed stalks to a central location, generally designated by the numeral 94. It will be appreciated that the drums 86 and 88 rotate in the same direction as the respective cutting discs 64 and 66. The drums 86 and 88 collectively span substantially the entire working width of the header 22 so that all the stalks severed by the cutting discs 64 and 66 are acted upon by the drums and thereby converged to the location 94 spaced forwardly from the chopping box 24.

Figure 6:
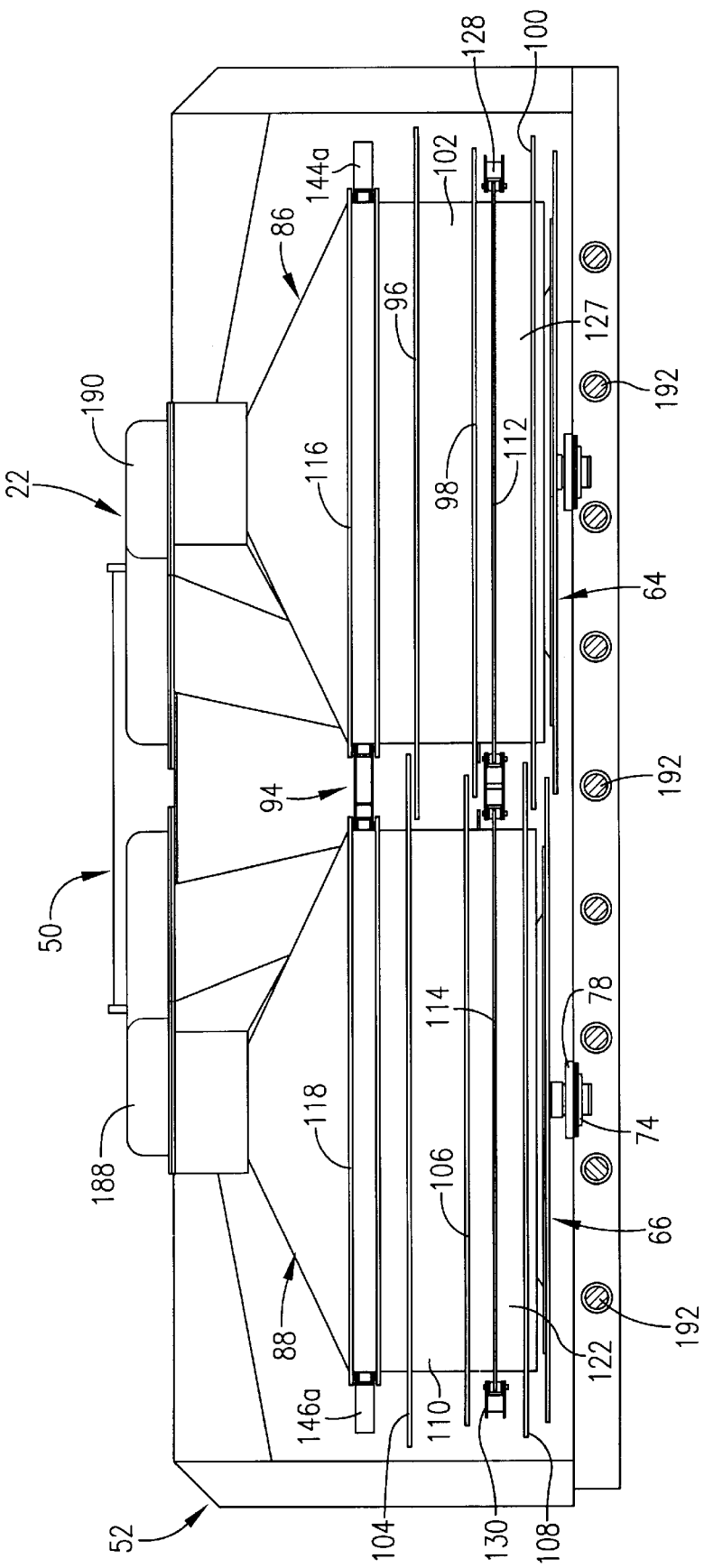
FIG. 6 is a front elevational view of the header with the crop separators being broken away to show the interrelationship of the transfer devices and cutting discs.

The left drum 86 has a plurality of circumferentially spaced fingers arranged in three rows 96,98,100 spaced vertically along the cylindrical sidewall 102 (see FIG. 6). As shown in FIG. 2, the fingers of the lower row 100 extend generally in the direction of rotation and thereby aggressively engage the crop. That is, as the drum 86 rotates in the direction indicated by arrow 90, the severed stalks are caught by the fingers of the lower row 100 and pulled toward the central location 94. This configuration is particularly useful when it is necessary to separate the crop from entangled masses of undergrowth or when harvesting downed crop, as those well skilled in the art will appreciate. The fingers of the upper and middle rows 96 and 98, on the other hand, extend generally opposite to the direction of rotation. Consequently, the foliage and upper portions of the crop are not as engaged as aggressively as the lower portion of the stalk. Additionally, it will be noted that the fingers of the upper row 96 project radially outwardly beyond the similarly configured fingers of the middle row 98 and are, therefore, better suited to handle the upper, relatively thicker foliage of the crop.

The right drum 88 likewise includes circumferentially spaced fingers arranged in three similarly configured rows 104,106,108 along its sidewall 110. However, as best shown in FIG. 6, the finger rows 104,106,108 of the right drum 88 are spaced slightly higher than the corresponding rows 96,98,100 of the left drum 86. It will be appreciated that the overlap of the fingers provides, among other things, the advantage of locating the drums in relatively close proximity to one another.

The drums 86 and 88 are otherwise similarly constructed and include vertically aligned sprockets wheels 112 and 114 projecting radially from the respective sidewalls 102 and 110, for purposes which will later be described (see FIG. 6). The drums drum 86 and 88 also include vertically aligned tracks 116 and 118, each of which are defined by a pair of vertically spaced rings attached around the respective sidewalls 102 and 110. Turning particularly to FIG. 5, the right drum 88 generally comprises the sprocket wheel 114, an upper casing 120 and a cylindrical lower casing 122. The upper casing 120 has a lower cylindrical portion, which cooperates with the lower casing 122 to form the sidewall 110, a middle frustoconical portion, and an upper cylindrical tip portion. The cylindrical portion of the upper casing 120 has a lower inturned edge fixedly attached to sprocket wheel 114, and the lower casing 122 similarly has an upper inturned edge fixedly attached to the sprocket wheel 114, such that the sprocket wheel and casings rotate as a single body. As shown in FIG. 5, the drive shaft 70 for the right cutting disc 66 extends through the hollow interior of the drum 88 and serves to rotatably support the drum on the header framework. A pair of upper and lower bearing assemblies 124 and 126 mount the drum 88 to the shaft 70 so as to allow relative rotational movement between the drum and shaft. Particularly, the upper bearing assembly 124 interconnects the tip portion of the upper casing 120 and the shaft 70, while the lower bearing assembly 126 interconnects the sprocket wheel 114 and the shaft 70. In this respect, the upright axis of rotation of the right drum 88 is coaxial with the rotational axis of the cutting disc 66. Further, with the drum 88 being rotatably mounted on the shaft 70, the shaft 70 is able to directly control rotational movement of the cutting disc 66 fixed thereto, without influencing rotation of the drum 88.

Although not illustrated or described in detail herein, it will be appreciated that the left transfer drum 86 is similarly constructed and mounted on an upright shaft 125 (see FIG. 2) for rotational movement about an upright axis that is coaxial with the rotational axis of the left cutting disc 64. It will be noted, however, that the lower casing 127 (see FIG. 6) of the drum 86 is slightly taller than the lower casing 122 of the drum 88 so as to accommodate the finger row 100 spaced relatively lower than the finger row 108.

As earlier mentioned, the transfer drums 86 and 88 serve to gather stalks severed by the cutting discs 64 and 66 to the central location 94, however, the radial fingers of the drums 86 and 88 disengage the stalks as they rotate past the central location. Accordingly, there is a stretch between the central location 94 and the chopping box 24, along which the stalks are not acted upon by the transfer drums. The length of this stretch may be determined by such factors as the size of the drums and the location of the drums relative to the chopping box 24. In the illustrated embodiment, the stretch is relatively long because the left drum 86 must be positioned sufficiently forward to avoid interference with the blower 26 (see FIG. 1). In other words, the relatively large gap defined between the rear boundaries of the drums 86,88 and the front of the chopping box 24 (see FIGS. 4 and 5) is larger than necessary to accommodate the size of the drums.

Again, it is highly problematic to simply gather the severed stalks at the central location and rely on the momentum of the stalks to carry them to the chopping box and the pressure of subsequently gathered stalks to push them rearwardly. Further, it would be highly advantageous to provide a means for feeding the gathered stalks rearwardly to the chopping box 24 irrespective of the distance between the central location 94 and chopping box. In this respect, the illustrated header includes a pair of left and right endless gripping chains 128 and 130, each having a plurality of spaced lugs 128a and 130a, respectively. The left gripping chain 128 entrains the sprocket 112 of the left drum 86 and extends rearwardly to wrap around a relatively smaller sprocket 132 (see FIG. 2) rotatably carried on an upright stub shaft (not shown). The small sprocket 132 is positioned relative to the sprocket 112 such that the left gripping chain 128 presents a run parallel to the fore-and-aft centerline of the header 22. The right gripping chain 130 similarly entrains the sprocket 114 of the right drum 88 and a relatively smaller sprocket 134 (see FIG. 4) to present an opposed run spaced on the opposite side of the fore-and-aft centerline of the header 22 from left gripping chain 128. As shown in FIG. 3, an L-shaped bar 136 is attached to the undersurface of a horizontal plate 138 to define a track which supports the left chain 128 as it travels rearwardly. The right gripping chain 130 similarly travels rearwardly toward the sprocket 134 along a track defined between an L-shaped bar 140 and a horizontal plate 142 (see also FIG. 4). Accordingly, the chains 128,130 present opposed runs extending generally from the central location 94 to a location immediately in front of the chopping box 24.

As shown in FIGS. 2 and 3, the chains 128 and 130 are arranged in such a manner that the lugs 128a and 130a become interdigitated along the opposed runs to grip each stalk therebetween. As specifically shown in FIG. 7, the lugs 128a and 130a are triangular shaped and form links in the respective chains 128 and 130. The opposed runs of the chains 128,130 thereby present a serpentine stalk-receiving space of uniform width which receives the severed stalks gathered at the central location 94. This arrangement ensures that each stalk S is grasped between the lugs. In fact, the lugs 128a, 130a actually bite into the stalks and form transverse creases so as to positively hold each severed stalk while it is moved rearwardly toward the chopping box 24. The positive gripping action of the chains 128,130 prevents axial displacement of the severed stalks so that a pan need not be placed below the stalk path. As those of ordinary skill in the art will appreciate, although pans prevent stalks from falling to the ground, they have a tendency to collect trash and crop residue. The gripping chains 128,130 also enable the header 22 to pull severed stalks from entangled masses of undergrowth and to convey even downed crop rearwardly to the chopping box 24. It will be noted that the opposed runs of the gripping chains 128,130 operate in a manner similar to the crop handling mechanism disclosed in U.S. Pat. No. 3,866,399, entitled SEVERED CROP HANDLING MECHANISM FOR HARVESTERS, assigned of record to the assignee of the present invention.

However, the gripping chains 128,130 of the present invention provide additional functions and advantages unavailable to the conventional crop handling mechanism. For example, the gripping chains 128, 130 extend laterally across the front of the header 22 toward the central location 94 to assist with gathering the crops severed by the cutting discs 64,66. Accordingly, the chains 128,130 have the dual function of gathering severed stalks to the central location 94 and feeding the stalks rearwardly to the chopping box 24, whereby the chains influence the flow of stalks essentially from the point where the stalks are severed until they have reached the chopping box. This configuration provides a very smooth transition as the laterally conveyed crops are directed rearwardly by the opposed runs of the gripping chains 128,130. Of course, this eliminates the problems associated with conventional non-row-sensitive forage harvesters which require that the severed stalks be transferred from a gathering drum to a conveyor drum as they move toward the chopping box. In the illustrated embodiment, the gripping chains 128 and 130 extend around the respective transfer drums 86 and 88 and, more specifically, entrain the sprockets 112 and 114. Thus, the speeds of the chains 128,130 and drums 86,88 are fixed relative to one another (i.e., the throughput rates of the transfer drums and the opposed runs of the gripping chains are coordinated) so as to minimize the risk of clogging and jamming of the opposed runs of the gripping chains. As will subsequently be described, the gripping chains 128 and 130 are drivingly connected to a source of power, and accordingly, the chains impart rotational movement to the drums 86 and 88. Furthermore, the gripping chains 128,130 arrange the severed stalks gathered at the central location 94 into a single file row such that the stalks are generally presented to the chopping box 24 in seriatim. It will be appreciated that the arrangement of the severed stalks in a generally single file row facilitates the laying down of the stalks so that the butt end is presented to the chopping box 24, and also minimizes the risk of clogging and jamming of the chopping box. Yet further, the gripping chains 128 and 130 serve to strip the stalks from the drums 86 and 88, respectively, as the stalks are moved rearwardly toward the chopping box 24. The stalks, all of which are located along the outside surface of the chains 128 and 130, are pulled from the respective drums 86 and 88 as the chains disengage the drums during their rearward travel, and the stalks are thereby prevented from being pulled around the drums. Further, because the stalks are clamped between the opposed runs of the gripping chains 128 and 130, the stalks are pulled from the drums 86 and 88 as they move rearwardly toward the chopping box 24. Of course, this reduces or eliminates the need for stationary strippers which tend to collect material, as previously described.

Although the gripping chains 128 and 130 are capable of grasping each severed stalk and moving it rearwardly the chopping box 24, it is preferred that the means for feeding the crop to the chopping box also includes structure for exerting a rearwardly directed force against the upper portion of the stalks to ensure that the entire stalk moves rearwardly with the gripping chains. In this respect, the non-row-sensitive header 22 includes a pair of endless conveying chains 144 and 146 spaced upwardly from the gripping chains 128 and 130 (see FIG. 6). As shown in FIG. 2, the conveying chains 144 and 146 have a plurality of spaced crop-engaging prongs 144a and 146a which form links within the respective chains (similar to the lugs 128a and 130a of the gripping chains 128 and 130). The conveying chains 144 and 146 wrap around the respective transfer drums 86 and 88 and, more particularly, travel within the tracks 116 and 118 of the drums (see FIGS. 4–6). Accordingly, the conveying chains 144 and 146 are unable to supply driving power to the transfer drums 86 and 88, except for any frictional interengagement therebetween. It will be appreciated that this simplifies the construction of the harvesting header 22 by eliminating the need to coordinate the speed of the gripping chains with the speed of the conveying chains. That is, because the conveying chains 144 and 146 do not entrain a sprocket on the transfer drums 86 and 88 and are thereby allowed to slip relative to the drums, the speed of the conveying chains and gripping chains need not be perfectly synchronized.

As those of ordinary skill in the art will appreciate, most crops have stalks which become progressively thicker as the ground is approached, with foliage projecting from the relatively thin upper portion of the stalks. Accordingly, it is undesirable and, with some crops, impossible to grip the relatively flimsy and foliated upper portion of the stalks. Thus, the crop engaging prongs 144a and 146a of each conveying chain 144 and 146 are spaced relatively further apart than the lugs 128a and 130a of each gripping chain 128 and 130 (i.e., only a single link separates adjacent lugs of the gripping chains, while a pair of links separate the prongs of the conveying chains). Although the crop-engaging prongs 128a,130a are consequently not designed to grip severed stalks therebetween, they do engage portions of the crop spaced upwardly from the gripping chains.

As shown in FIG. 2, the left conveying chain 144 extends rearwardly to entrain a relatively smaller sprocket 148 carried on an upright shaft 150. For purposes which will be described below, the shaft 150 is positioned laterally outwardly from the sprocket 132 entrained by the left gripping chain 128. Turning to FIG. 5, the right conveying chain 146 likewise extends rearwardly from the transfer drum 88 to entrain a sprocket 152 carried on a similarly spaced upright shaft 154. The conveying chains 144 and 146 consequently present opposed runs which diverge as the chopping box 24 is approached, whereby the prongs 144a and 146a gradually disengage the crop as the chains move rearwardly. This allows the stalks to be placed in a generally horizontal orientation as they move rearwardly so that the butt end of each stalk is presented to the inlet 28 of the chopping box 24.

It will be appreciated that the sprockets 132,134,150,152 have the same diameter so that the gripping chains 128,130 and conveying chains 144,146 move at generally the same speed.

Because the conveying chains 144 and 146 wrap around the transfer drums 86 and 88 and extend rearwardly toward the chopping box 24, the conveying chains not only assist with gathering stalks cut by the cutting discs 64 and 66 (similar to the gripping chains 128 and 130), but also engage the stalks at a point spaced upwardly from the gripping chains to exert a rearwardly directed force against the crop for ensuring that the entire stalk moves toward the chopping box. The fact that the conveying chains 144 and 146 extend laterally across the front of the header 22 and rearwardly to the chopping box 24 provides advantages and functions similar to those identified for the gripping chains 128 and 130. For example, stalks severed by the cutting discs 64,66 are conveyed by the conveying chains 144,146 and gripping chains 128,130 across the front of the header and rearwardly to the chopping box 24, which avoids the problems associated with conventional non-row-sensitive harvesting headers having a separate feeding device for feeding the stalks from the transfer drums to the chopper. Of course, there is the unlikely possibility that a severed stalk may not be engaged by either the gripping chains 128,130 or the conveying chains 144,146 as it is transferred toward the central location 94. In such an instance, however, the gripping lugs 128a and 130a, which start interdigitating at the central location 94, grab stalks carried only by the transfer drums 86 and 88 so that the gripping chains control the flow of crop before the drums disengage the stalks. Again, the conveying chains 144,146 facilitate this action by causing a rearwardly directed force to be exerted against the stalks at a point spaced upwardly from the gripping chains 128,130, even though the prongs 144a, 146a may not engage each and every stalk. Further, in a manner similar to the gripping chains 128 and 130, the conveying chains 144 and 146 assist with stripping the stalks from the respective transfer drums 86 and 88.

The means for feeding the severed stalks rearwardly to the chopping box 24 further includes a pair of auger cylinders 156 and 158 spaced immediately in front and on opposite sides of the inlet 28 of the chopping box 24 (see FIGS. 2, 4 and 5). As perhaps best shown in FIG. 4, the right auger cylinder 158 is positioned vertically between the gripping chain 130 and conveying chain 146. It will be appreciated that the left auger cylinder is likewise positioned vertically between the gripping chain 128 and conveying chain 144. The left auger cylinder 156 is fixed to the upright shaft 150 and is therefore coaxial with the sprocket 148, while the right auger cylinder 158 is fixed to the upright shaft 154 and is coaxial with the sprocket 152. Accordingly, the upright shafts 150 and 154 drive the conveying chains 144 and 146 and auger cylinders 156 and 158.

As shown in FIG. 4, the auger cylinder 158 is provided with flighting 158a which forces crop downwardly toward a position generally vertically aligned with the chopping box inlet 28, when the cylinder is rotated in a counterclockwise direction (viewed from the top). The flighting 158a also serves to direct loose crop, such as detached ears or the foliage projecting from the upper stalk, downwardly into engagement with the portions of the stalks clamped between the gripping chains 128 and 130. The stalks clamped between the gripping chains 128 and 130 thereby draw the loose crop material into the chopping box inlet 28. The left auger cylinder 156 likewise includes fighting (not shown) which directs crop toward the chopping box inlet 28 and into engagement with the portions of the stalk clamped between the gripping chains 128 and 130.

At the top of each cylinder 156 and 158 is a stripping disc 156b and 158b, respectively. As perhaps best shown in FIG. 2, the disc 156b of the left auger cylinder 156 has a radial dimension that is substantially similar to the radial dimension of the conveying element 144. That is, the radius of the disc 156b is substantially similar to the radial length defined between the center of the sprocket 148 and the tip of the conveying prong 144a. Although not shown in a top plan view, it will be appreciated that the disc 158b of the right auger cylinder 158 has the same radial dimension as the conveying chain 146 at the sprocket 152. As indicated above, the discs 156b and 158b rotate at generally the same speed as the respective conveying chains 144 and 146. Further, the disc 158b is positioned immediately below the conveying chain 146 and consequently serves to strip material from the chain (see FIGS. 4 and 5). Thus, the discs 156b and 158b prevent material from accumulating on the conveying chains 144 and 146 and from clogging the the sprockets 148 and 152. It has been determined that because the stripping discs 156b and 158b rotate, they are less likely to collect material than conventional stationary stripping elements.

Similar to conventional live corner elements, the auger cylinders 156 and 158 provide a live rotating surface that draws material around the corner and into the chopping box inlet 28. Of course, this facilitates the feeding of downed stalks into the chopping box inlet 28. For example, if a stalk is gripped between the chains 128 and 130 but the upper portion thereof has fallen to either side of the harvester 10, the cylinder 156 or 158 acts as an extension of the feed mechanism to draw the downed stalk toward the chopping box inlet 28. However, conventional corner elements are prone to material back-wrap problems, wherein stalks, foliage, trash, etc. have a tendency to wrap around and accumulate on the elements because of the aggressive nature of their outer surfaces (i.e., a ribbed outer surface presents a plurality of leading edges that catch material). The illustrated auger cylinders 156 and 158, however, present generally smooth, continuous, outer surfaces that are less likely to catch material. Further, the auger cylinders 156 and 158 not only present live corner surfaces but also force the material downwardly into engagement with the positively driven stalk portions clamped between the gripping chains 128 and 130, as previously described.

A drive mechanism couples the various driveable components of the header 22 to the drive shaft 20. Of course, in a self-propelled unit (not shown) the drive mechanism would couple the components to the onboard engine. In the illustrated embodiment, the drive mechanism includes a sprocket 160 carried on a transverse shaft 162 and entrained by a chain (not shown) that drivingly connects the sprocket to the drive shaft 20, although a belt drive may be utilized to supply power to the shaft 162. The shaft 162 also carries four laterally spaced bevel gears 164,166,168,170 which intermesh with respective bevel gears 172,174,176,178. The gears are housed within a protective casing 180 (see FIG. 4).

As shown in FIG. 5, the bevel gear 178 is fixed to the upright shaft 154 carrying the auger cylinder 158 and the sprocket 152 entrained by the conveying chain 146, whereby rotation of the transverse shaft 162 drives the auger cylinder 158 and the conveying chain 146. Adjacent the upper end of the shaft 154 is a sprocket 182 which is entrained by an endless chain 184. As shown in FIG. 2, the chain extends forwardly from the sprocket 182 to wrap around a relatively smaller sprocket 186 carried on the upright shaft 70.

Accordingly, the shaft 70 is caused to rotate at a faster speed than the shaft 154. As earlier mentioned, the shaft 70 extends down through the transfer drum 88 and carries the cutting disc 66, such that the cutting disc 66 also has a greater angular velocity than the upright shaft 154. As perhaps best shown in FIG. 5, a cover plate 188 extends over the sprockets 182,186 and the chain 184 to minimize contamination from trash, debris and weather conditions. The bevel gear 172 is similarly fixed to the upright shaft 150 carrying the left auger cylinder 156 and the sprocket 148 entrained by the conveying chain 144. Additionally, housed within the cover plate 190 (see FIGS. 1 and 6) is a chain drive (not shown) operably coupling the shaft 150 to the shaft 125 and having the same sprocket ratio as the sprockets 182,186. Thus, rotation of the transverse shaft 162 likewise drives the conveying chain 144, the auger cylinder 156 and the cutting disc 64.

The bevel gears 174 and 176 are fixed to the upright shafts (not shown) carrying the sprockets 132 and 134 entrained by the gripping chains 128 and 130, respectively. Thus, rotation of the transverse shaft 162 also drives the gripping chains 128,130. Further, because the gripping chains 128 and 130 wrap around the sprocket wheels 112 and 114, the shaft 162 also transmits driving power to the transfer drums 86 and 88. Indeed, because the sprocket wheels 112 and 114 are larger than the sprockets 132 and 134, the transfer drums 86 and 88 are rotated at a slower speed than the bevel gears 174 and 176. It will be appreciated that the gear ratios for the pairs of intermeshing bevel gears are the same, and accordingly, the upright shafts carrying the gears 172,174,176,178 rotate at the same speed. Therefore, the cutting discs 64 and 66 rotate at a relatively faster speed than the transfer drums 86 and 88.

Projecting forwardly from the box frame 52 are a plurality of laterally spaced rods 192, each of which carries a triangular crop separator 194 at its forwardmost end (see FIGS. 1–4). The separators 194 divide the stalks presented to the header 22 into several manageable masses which provides several advantages well known in the industry. For example, the separators 194 minimize the risk of stalks being pulled toward the central location 94 before being severed by the cutting discs 64 and 66. As shown in FIG. 2, the crop separators 194 are tapered at their forwardmost ends so as to facilitate stalk movement around the separators, thereby preventing crop from being pushed over by the separators as the harvester 10 advanced across a field. Extending from the rear of each separator 194 is a guide bar 196 which is spaced from the respective transfer drum and extends around the drum in the direction of rotation (see FIGS. 2 and 4). As will further be described below, the guide bars 196 direct the stalks inwardly toward the sidewalls 102 and 110 of the transfer drums 86 and 88 for ensuring that each stalk is severed by the respective cutting disc 64 and 66 and for retaining the severed stalks against the drums as they are transferred to the central location 94.

OPERATION

As the frame 12 is pulled across a field by the towing vehicle (not shown), the PTO is actuated so that the drive mechanism transmits driving power to the various harvester components. All stalks located between the outer guides 56 and 58 are ultimately severed by the cutting discs 64,66 and conveyed to the chopping box 24 by the transfer drums 86,88, gripping chains 128,130 and conveying chains 144, 146. Thus, the non-row-sensitive header 12 cuts a swath in the field irrespective of crop row placement. For purposes of illustration, the movement of a single stalk located in front of the right side of the header 22 will be described below, with the understanding that at any given time many stalks on both sides of the header are being acted upon by the various harvesting components in a similar manner.

As the header is moved through a field the stalk is received between adjacent crop separators 194. Although the cutting disc 66 has a larger diameter than the cylindrical periphery of the transfer drum 88, the fingers projecting from the drum will most likely engage the stalk before it is severed. The prongs 144a of the conveying chain 144 also project slightly beyond the outer diameter of the cutting disc 66. However, the stalk is moved only slightly before it is cut near the ground by the cutting disc 66. Indeed, the fact that the cutting disc 66 rotates relatively faster than the transfer drum 88 ensures severance of the stalk even if it is shifted slightly before being cut by the disc 66. Once the stalk is severed, the fingers of the drum 88, the lugs 130a of the gripping chain 130, the prongs 146a of the conveying chain 146, or any combination thereof, has engaged the stalk and thereby moves it toward the central location 94. As the stalk is moved along its circular path around the drum 88, the first guide bar 196 encountered by the stalk directs it inwardly toward the drum sidewall 110. The remaining guide bars 196 encountered by the stalk retain the stalk against the drum 88 as it travels toward the central location 94. It is believed that as the stalk moves toward the central location, the butt end of the stalk rests against the upper surface of the cutting disc 66. Thus, the cutting disc 66 functions as a pan for preventing the severed stalk from falling to the ground once it has been severed.

Once the stalk reaches the central location, the fingers from the left transfer drum 86 most likely also engage the stalk to move it toward the chopping box 24. Moreover, the lugs 130a of the gripping chain 130 become interdigitated with the lugs 128a of the gripping chain 128, whereby the stalk is crimped between the opposed runs of the gripping chains. The revolving fingers of the transfer drums 86,88 eventually disengage the stalk as it is moved rearwardly by the gripping chains 128,130. Such disengagement is facilitated by the gripping chains 128,130 and conveying chains 144,146, as previously described. Further, as shown in FIG. 4, stationary strippers 198 are also provided on vertically opposite sides of the upper and middle finger rows, 104 and 106, of the transfer drum 88 for preventing crop from clinging to the fingers and being pulled around the drum and away from the chopping box (i.e., to ensure the fingers disengage the crop). A similar set of strippers (not shown) are provided for stripping crop from the upper and middle rows, 96 and 98, of the left transfer drum 86.

As previously indicated, the conveying chains 144,146 do not positively control the rearward travel of the stalk like the gripping chains 128,130. However, the conveying chains 144,146 do exert a rearwardly directed force against the stalk at a point spaced upwardly from the gripping chains 128,130 to ensure the entire stalk moves rearwardly with the gripped portion. It will be appreciated that without the conveying chains 144,146, the stalk may have insufficient lateral stability to remain upright as it travels rearwardly. Although the stalk will eventually be placed in a horizontal orientation so that its butt end is presented to the chopping box 24, it is undesirable to have the stalk sway from side-to-side or fall rearwardly during its rearward movement.

As the stalk approaches the chopping box 24, the upper end of the stalk engages a knock-down bar 200 extending between the cover plates 188,190. The conveying chains 144,146 have diverged sufficiently at the bar 200 to release the stalk so that the stalk may be place in the desired horizontal orientation. Particularly, the knock-down bar 200 restricts rearward travel of the upper end of the stalk, while the gripping chains 128,130 continue to move the gripped portion of the stalk rearwardly. Specifically, the stalk is bent forwardly to lie in a generally horizontal orientation. As the stalk continues to move toward the chopping box 24, the rotating auger cylinders 156,158 direct the crop downwardly toward the chopping box inlet 28 or, at least into engagement with the portions of the stalks clamped between the gripping chains 128 and 130. Accordingly, the cylinders direct the crop, including any foliage, corn ears, etc., and any portion of the stalk which has returned to its upright position after being knocked down by the bar 200 into the inlet 28. When the stalk is knocked down by the bar 200, the stalk bends at some point spaced above the gripping chains 128,130. However, as the gripping chains 128 and 130 wrap around the sprockets 132 and 134 to release the stalk, the portion of the stalk below the bend springs up into alignment with the remaining horizontal portion of the stalk, whereby the butt end of the stalk is directed into the chopping box inlet 28.

In this respect, the stalk is never released from the control of the header 22 as it moves from the point at which is severed to the chopping box 24. Contrary to some conventional non-row-sensitive harvesters, the stalk is not transferred from a gathering device, such as a transfer drum which moves the stalk to a location spaced from the chopping box, to a feed device, such as a conveyor drum which conveys the stalk from the transfer drum to the chopper. That is, the illustrated header 22 employs mechanism (the gripping chains 128,130 and conveying chains 144,146) common to both the means for gathering the stalk to the central location 94 and the means for feeding the stalk to the chopping box 24. Furthermore, movement of the stalk from the central location 94 to the chopping box 24 is positively controlled by the gripping chains 128,130 as previously described. Again, the description of this single stalk is representative of all the other stalks which are simultaneously being harvested by the header 22.

Figures 8, 9:
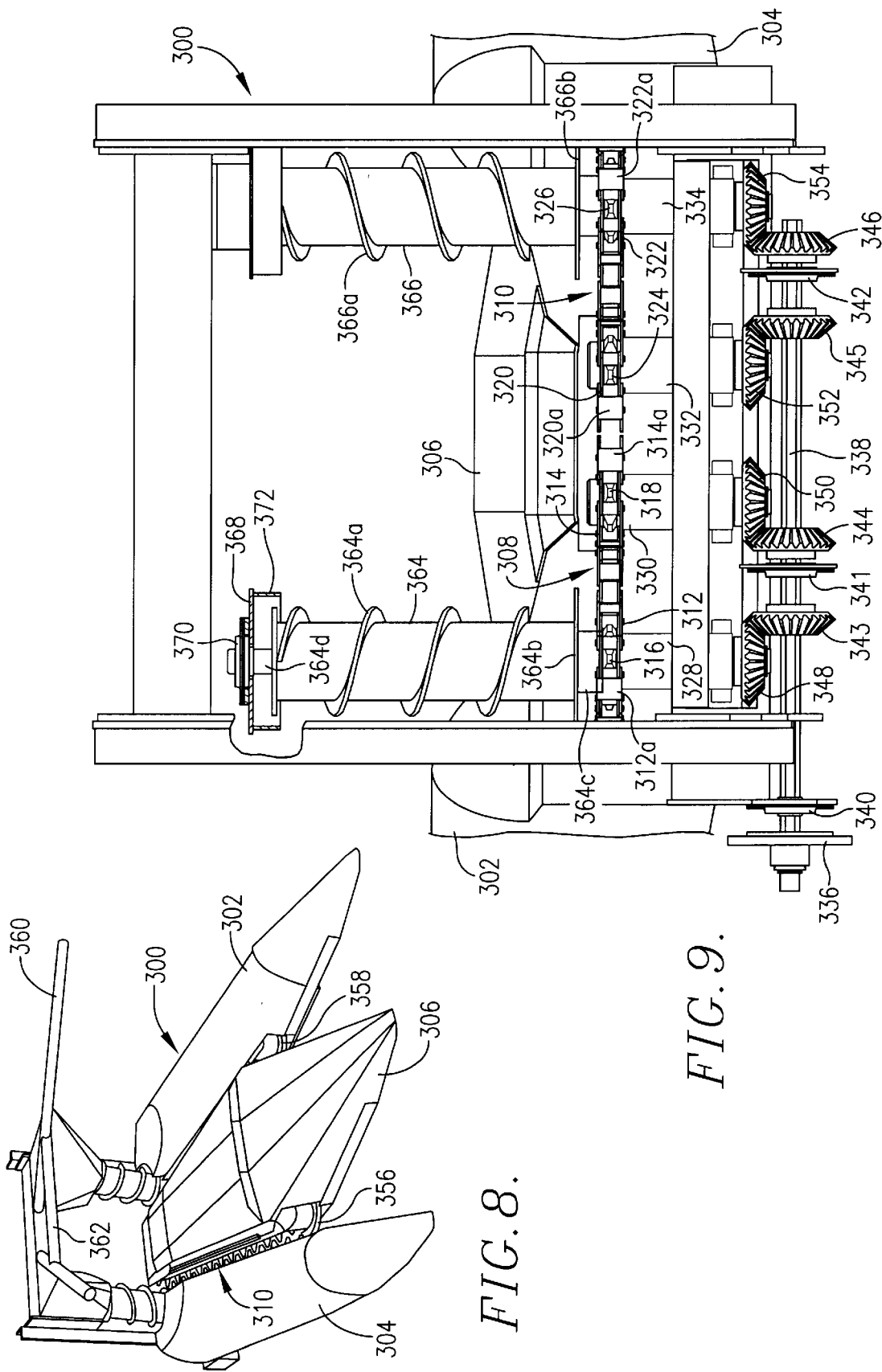
FIG. 8 is a perspective view of a two-row forage harvesting header having auger cylinders constructed in accordance with the principals of the present invention.
FIG. 9 is an enlarged rear elevational view of the header shown in FIG. 8, with parts being broken away to show the transmission for powering the cylinders and gripping elements.

It has been determined that the auger cylinders may also be provided on a row harvesting header. In this respect, FIG. 8 shows a two-row header 300 constituting a composite unit that may be detachably mounted in any conventional manner to a chassis (e.g., the chassis shown in FIGS. 1 and 4) for swinging movement about a transverse axis. Similar to the non-row-sensitive header 22 shown in FIGS. 1–7, the two-row header 300 may be carried on a self-propelled frame or prime mover.

The header 300 has a generally conventional construction, and accordingly, it is sufficient to explain that the header generally includes a pair of outer guides 302 and 304 defining the lateral boundaries of the header, a central guide 306 located between the outer guides 302 and 304, and two crop gathering mechanisms, broadly designated by the numerals 308 and 310, located in the spaces defined between the guides. The gathering mechanisms 308 and 310 each present a forwardly facing inlet end and a rearwardmost outlet end. Further, the gathering mechanisms 308 and 310 converge as the rear of the header 300 is approached so that the outlet ends of the mechanisms are located just in front of the chopper inlet (not shown) when the header is attached to a chassis.

The gathering mechanisms 308 and 310 are substantially similar in construction to the gripping chains 128 and 130 shown in FIGS. 1–7. For example, the left gathering mechanism 308 comprises a pair of endless chains 312 and 314 each having a plurality of spaced lugs 312a and 314a which become interdigitated along the opposed runs of the chains for clamping stalks therebetween. The chains 312 and 314 entrain front sprockets (not shown) adjacent the inlet end and rear sprockets 316 and 318 adjacent the outlet end. The right gathering mechanism 310 similarly includes a pair of endless gripping chains 320 and 322 having lugs 320a and 322a, and entraining front sprockets (not shown) adjacent the inlet end and rear sprockets 324 and 326 adjacent the outlet end. The sprockets 316,318,324,326 are carried on respective upright shafts 328,330,332,334.

A drive mechanism serves to drivingly couple the various driveable components of the header 300 to a power source (not shown). As shown in FIG. 9, the drive mechanism includes a sprocket or pulley 336 carried on a transverse drive shaft 338 rotatably mounted to the header framework by bearing assemblies 340,341,342. The sprocket 336 is entrained by an endless element (not shown), such as a chain or belt, that entrains a similar sprocket or pulley connected to the power source. The shaft supports four vertically disposed bevel gears 343,344,345,346 intermeshing with corresponding bevel gears 348,350,352,354 carried on the upright shafts 328,330,332,334. Accordingly, rotation of the drive shaft 338 supplies driving power to the gathering mechanisms 308 and 310.

A suitable cutter 356 and 358 is provided at the inlet end of each of the gathering mechanisms 308 and 310 for severing the stalks as the header 300 is moved across a field. Accordingly, the header is designed to harvest rows of crop spaced at a distance generally equal to the distance between the inlet ends of the gathering mechanisms 308 and 310. Particularly, the header 300 is moved across a field in alignment with two rows of stalks so that the stalks entering the forwardly facing inlet ends of the gathering mechanisms 308 and 310 are severed by the cutters 356 and 358. Upon severance or immediately thereafter, the stalks are gripped between the gripping chains of the mechanisms 308 or 310 and conveyed rearwardly to the chopper inlet. A forwardly projecting guide 360 (often referred to as "bullhorns") is provided for guiding and converging the upper portions of the stalks as they move rearwardly toward the chopper. The guide 360 includes a knock-down bar 362 for placing the stalks in a horizontal orientation so that they are presented to the chopping box butt end first.

Moreover, the header 300 includes a pair of auger cylinders 364 and 366 projecting upwardly from the outlet end of the gathering mechanisms 308 and 310 to provide a live rotating surface at the corners of the chopping box inlet and for directing the crop downwardly toward the inlet and into engagement with the portions of the stalk clamped by the gathering mechanisms 308 and 310. Similar to the cylinders 156 and 158 provided in the header shown in FIGS. 1–7, the auger cylinders 364 and 366 each include flighting 364a and 366a and a stripping disk 364b and 366b. As shown in FIG. 9, the left auger cylinder 364 includes a lower hub 364c that is fixed to the sprocket 316 by suitable means so that the auger cylinder 364 rotates with the sprocket 316. The upper end of the auger cylinder 364 includes a stub shaft 364d rotatably supported on a horizontal mounting plate 368 by a bearing assembly 370. A stationary ring 372 projects downwardly from the mounting plate 368 to protectively envelope the upper portion of the auger cylinder 366. Although not shown in detail, it will be appreciated that the stripping disc 364 has generally the same radially dimension as the outermost gripping chain 312 at the sprocket 316. The right auger cylinder 366 is similarly configured and therefore will not be described in detail herein.

Thus, the auger cylinders 364 and 366 rotate at substantially the same speed as the gripping chains 312,314,320,322 to function in the same manner as the auger cylinders 156 and 158 described hereinabove. That is, the auger cylinders 364 and 366 provide a live rotating surface that draws the stalks laterally across the header toward the chopping box inlet. The flighting 364a and 366a of the auger cylinders 364 and 366 propels crop material downwardly toward the chopping box inlet and into engagement with the portions of the stalks gripped by the mechanisms 308 and 310. As indicated above, this facilitates the transfer of loose crop material to the chopping box inlet. Further, the stripping discs 364b and 366b prevent material from accumulating on the gripping chains 312 and 322 and from clogging the sprockets 316 and 326.

The preferred forms of the invention described above are to be used as illustration only, and should not be utilized in a limiting sense in interpreting the scope of the present invention. Obvious modifications to the exemplary embodiments, as hereinabove set forth, could be readily made by those skilled in the art without departing from the spirit of the present invention.

For example, the non-row-sensitive header may be modified so that the rows of transfer fingers 96,98,100 and 104,106,108 are carried on vertically spaced discs rather than a single drum 86 and 88. Further, the gripping and conveying chains 128,130,144,146 may alternatively comprise endless belts carrying the gripping lugs and conveying prongs. The non-row-sensitive header may alternatively be provided with more than two transfer drums. It is also possible to utilize one or two drums which gather the severed stalks along one or both sides of the header, with the drum(s) being entrained by a chain which moves the gathered stalks along a track to the chopper.

The principals of the present invention are equally applicable to other variously constructed auger cylinders utilized on either row or non-row-sensitive harvesting headers. For example, the cylinders may have a frusto-conical shape as opposed to the cylindrical shape shown in the drawing figures. Further, the cylinders may be provided with more than one flighting to more aggressively propel the crop downwardly.

The inventors hereby state their intent to rely on the Doctrine of Equivalents to determine and assess the reasonably fair scope of the present invention as pertains to any apparatus not materially departing from but outside the literal scope of the invention as set forth in the following claims.

What is claimed is:

1. A non-row-sensitive forage harvesting header for attachment to a mobile frame carrying a chopper for chopping severed stalks of crop received from the header, wherein said header comprises:

a cutter for severing the stalks as the frame moves across a field, said cutter adapted to be spaced forwardly of the chopper when the header is attached to the frame;

a pair of transfer devices rotatable about spaced upright axes for gathering severed stalks to a location spaced from the chopper; and an apparatus operable to grip each gathered stalk while moving the stalk from the location to the chopper for positively controlling the flow of crop between the location and chopper, said apparatus including a pair of moveable endless gripping elements wrapping about respective ones of the transfer devices and presenting opposed runs adapted to extend between the location and the chopper when the header is attached to the frame, said runs of the gripping elements being operable to cooperatively grip each gathered stalk therebetween while moving the stalk.

2. A non-row-sensitive harvesting header as claimed in claim 1, each of said gripping elements including a plurality of spaced stalk-gripping lugs which become interdigitated with the lugs of the other gripping element along the opposed runs for clamping the stalks therebetween.

3. A non-row-sensitive harvesting header as claimed in claim 2, said transfer devices each comprising a drum-shaped body having a generally cylindrical periphery and a plurality of circumferentially spaced fingers projecting outwardly from the periphery of the body.

4. A non-row-sensitive harvesting header as claimed in claim 3, said fingers being arranged in vertically spaced rows on said body.

5. A non-row-sensitive harvesting header as claimed in claim 1; and a conveyor operable to exert a force on the gripped stalk in a direction toward the chopper at a point spaced vertically from the apparatus for ensuring the entire stalk moves from the location to the chopper.

6. A non-row-sensitive harvesting header as claimed in claim 5, said conveyor comprising a pair of moveable endless conveying elements presenting opposed runs adapted to extend between the location and the chopper when the header is attached to the frame, said runs of the conveying elements being operable to cooperatively exert a force on the gripped stalk in a direction toward the chopper.

7. A non-row-sensitive harvesting header as claimed in claim 6, said conveying elements each comprising a chain carrying a plurality of spaced crop-engaging prongs.

8. A non-row-sensitive harvesting header as claimed in claim 6, said conveying elements diverging along said runs for progressively disengaging the stalks as the stalks are moved from the location.

9. A non-row-sensitive harvesting header as claimed in claim 6, said apparatus being positioned to grip the stalks adjacent the severed ends thereof, said conveying elements being spaced upwardly from the apparatus.

10. A non-row-sensitive harvesting header as claimed in claim 1, said cutter including a pair of rotatable discs having rotational axes coaxial with the upright axes of the transfer devices.

11. A non-row-sensitive harvesting header as claimed in claim 10, said discs rotating in the same direction as respective ones of the transfer devices.

12. A non-row-sensitive harvesting header as claimed in claim 1; and a knock-down bar positioned above the apparatus for engaging the stalks as they are moved toward the chopper so that the stalks are thereby oriented in a generally horizontal position.

13. A non-row-sensitive harvesting header as claimed in claim 1, a pair of auger members rotatable about upright, laterally spaced axes positioned adjacent the chopper when the header is attached to the frame, each of said cylinders having flighting for directing the stalks toward the chopper.

14. A non-row-sensitive harvesting header for attachment to a mobile frame carrying a chopper for chopping severed stalks of crop received from the header, wherein said header comprises:

a cutter for severing the stalks as the frame moves across a field, said cutter adapted to be spaced forwardly of the chopper when the header is attached to the frame;

a pair of transfer devices rotatable about spaced upright axes for gathering severed stalks to a location spaced from the chopper; and an apparatus operable to grip each gathered stalk while moving the stalk from the location to the chopper for positively controlling the flow of crop between the location and chopper, said apparatus including a pair of moveable endless gripping elements presenting opposed runs adapted to extend between the location and the chopper when the header is attached to the frame, said runs of the gripping elements being operable to cooperatively grip each gathered stalk therebetween, each of said gripping elements including a plurality of spaced stalk-gripping lugs which become interdigitated with the lugs of the other gripping element along the opposed runs for clamping the stalks therebetween, said transfer devices each comprising a drum-shaped body having a generally cylindrical periphery and a plurality of circumferentially spaced fingers projecting outwardly from the periphery of the body, each of said gripping elements further extending about the periphery of a respective one of the transfer devices, said gripping elements comprising endless chains, each of said transfer devices including a circumferential sprocket, each of said chains entraining the sprocket of a respective one of the transfer devices.

15. A non-row-sensitive harvesting header as claimed in claim 14, and drive mechanism connectable to a source of power and drivingly coupled with the gripping elements such that the gripping elements impart rotational movement to the transfer devices.

16. A non-row-sensitive harvesting header as claimed in claim 15, and a conveyor operable to exert a force on the gripped stalk in a direction toward the chopper at a point spaced vertically from the gripping elements for ensuring the entire stalk moves with the gripping elements.

17. A non-row-sensitive harvesting header as claimed in claim 16, said conveyor comprising a pair of moveable endless conveying elements presenting opposed runs adapted to extend between the location and the chopper when the header is attached to the frame, said runs of the conveying elements being operable to cooperatively exert a force on the gripped stalk in a direction toward the chopper.

18. A non-row-sensitive harvesting header as claimed in claim 17, each of said conveying elements further extending about the periphery of a respective one of the transfer devices.

19. A non-row-sensitive harvesting header as claimed in claim 18, said conveying elements each comprising a chain carrying a plurality of spaced crop-engaging prongs.

20. A non-row-sensitive harvesting header as claimed in claim 19, said prongs of the conveying elements being spaced relatively further apart than the lugs of the gripping elements.

21. A non-row-sensitive harvesting header as claimed in claim 18, said conveying elements diverging along said runs for progressively disengaging the stalks as the stalks are moved from the location.

22. A non-row-sensitive harvesting header as claimed in claim 18, said gripping elements being positioned to grip the stalks adjacent the severed ends thereof, said conveying elements being spaced upwardly from the gripping elements.

23. A non-row-sensitive harvesting header as claimed in claim 22, and a pair of auger members rotatable about upright, laterally spaced axes positioned adjacent the chopper when the header is attached to the frame, each of said cylinders having flighting for directing the stalks toward the chopper.

24. A non-row-sensitive harvesting header as claimed in claim 23, each of said members presenting a cylindrical shape.

25. A non-row-sensitive harvesting header as claimed in claim 23, said members extending vertically between respective ones of the gripping elements and conveying elements, with the flighting of each of the members directing the stalks downwardly toward the gripping elements.

26. A non-row-sensitive harvesting header as claimed in claim 25, each of said members being rotated in the same direction as respective ones of the gripping elements and conveying elements.

27. A non-row-sensitive harvesting header as claimed in claim 26, each of said members including a stripping disc adjacent a respective one of the conveying elements for stripping stalks therefrom.

28. A non-row-sensitive harvesting header as claimed in claim 27, each of said conveying elements wrapping around a rear sprocket coaxial with a respective one of the member axes, said one conveying element at the sprocket and the disc having substantially similar radial dimensions.

29. A non-row-sensitive harvesting header as claimed in claim 26, said cutter including a pair of rotatable discs having rotational axes coaxial with the upright axes of the transfer devices.

30. A non-row-sensitive harvesting header as claimed in claim 29, said discs rotating in the same direction as respective ones of the transfer devices.

31. A non-row-sensitive harvesting header as claimed in claim 30, and a knock-down bar positioned above the conveying elements for engaging the stalks as they are moved toward the chopper so that the stalks are thereby oriented in a generally horizontal position.

32. A non-row-sensitive forage harvesting header for attachment to a mobile frame carrying a chopper for chopping severed stalks of crop received from the header, wherein said header comprises:

a cutter for severing the stalks as the frame moves across a field, said cutter adapted to be spaced forwardly of the chopper when the header is attached to the frame;

gathering means for gathering the severed stalks to a location spaced forwardly from the chopper; and feeding means for feeding the gathered stalks rearwardly from the location to the chopper, said gathering means and said feeding means sharing a common mechanism configured to move the severed stalks to the location and rearwardly to the chopper in such a manner that the mechanism does not release the severed stalks from its control until the stalks have been delivered to the chopper, said gathering means including a pair of generally cylindrical transfer devices rotatable about spaced upright axes, said transfer devices being positioned forwardly from the chopper when the header is attached to the frame, said common mechanism including a first pair of moveable endless elements wrapping about respective ones of the transfer devices and adapted to extend rearwardly from the devices toward the chopper when the header is attached to the frame.

33. A non-row-sensitive harvesting header as claimed in claim 32, said transfer devices being rotatable in opposite directions for centralizing the severed stalks, said first pair of endless elements presenting opposed rearwardly moveable runs adapted to extend between the location and the chopper when the header is attached to the frame, said opposed runs of the first pair of elements being operable to cooperatively grip each gathered stalk therebetween while moving the stalk rearwardly from the central location.

34. A non-row-sensitive harvesting header as claimed in claim 33, each of said first pair of elements carrying a plurality of spaced stalk-gripping lugs which become interdigitated with the lugs of the other element along the opposed runs for clamping the stalks therebetween.

35. A non-row-sensitive harvesting header as claimed in claim 34, said mechanism including a second pair of moveable endless elements extending about respective ones of the transfer devices and presenting opposed rearwardly moveable runs adapted to extend between the location and the chopper when the header is attached to the frame, said opposed runs of the second pair of elements cooperatively exerting a rearwardly directed force on the gripped stalk at a point spaced vertically from the first pair of elements for ensuring the entire stalk moves rearwardly with the first pair of elements.

36. A non-row-sensitive harvesting header as claimed in claim 35, said first pair of elements being positioned to grip the stalks adjacent the severed ends thereof, said second pair of elements being spaced upwardly from the first pair of elements.

37. A non-row-sensitive harvesting header as claimed in claim 32, said first pair of elements comprising endless chains, each of said transfer devices including a circumferential sprocket, each of said chains entraining the sprocket of a respective one of the transfer devices.

38. A non-row-sensitive harvesting header as claimed in claim 37, and drive mechanism connectable to a source of power and drivingly coupled with the first pair of elements such that the first pair of elements impart rotational movement to the transfer devices.

39. A non-row-sensitive harvesting header as claimed in claim 32, said cutter including a pair of rotatable discs having rotational axes coaxial with the upright axes of the transfer devices.

40. A non-row-sensitive harvesting header as claimed in claim 39, said discs rotating in the same direction as respective ones of the transfer devices.

41. A non-row-sensitive forage harvesting header for attachment to a mobile frame carrying a chopper for chopping severed stalks of crop received from the header, wherein said header comprises:

a cutter for severing the stalks as the frame moves across a field, said cutter adapted to be spaced forwardly of the chopper when the header is attached to the frame;

gathering means for gathering the severed stalks to a location spaced forwardly from the chopper; and feeding means for feeding the gathered stalks rearwardly from the location to the chopper, said gathering means and said feeding means sharing a common mechanism configured to move the severed stalks to the location and rearwardly to the chopper in such a manner that the mechanism does not release the severed stalks from its control until the stalks have been delivered to the chopper, said gathering means including a pair of generally cylindrical transfer devices rotatable about spaced upright axes, said transfer devices being positioned forwardly from the chopper when the header is attached to the frame, said common mechanism including a first pair of moveable endless elements extending about respective ones of the transfer devices and rearwardly therefrom, said transfer devices being rotatable in opposite directions for centralizing the severed stalks, said first pair of endless elements presenting opposed rearwardly moveable runs adapted to extend between the location and the chopper when the header is attached to the frame, said opposed runs of the first pair of elements being operable to cooperatively grip each gathered stalk therebetween while moving the stalk rearwardly from the central location, each of said first pair of elements carrying a plurality of spaced stalk-gripping lugs which become interdigitated with the lugs of the other element along the opposed runs for clamping the stalks therebetween, said mechanism including a second pair of moveable endless elements extending about respective ones of the transfer devices and presenting opposed rearwardly moveable runs adapted to extend between the location and the chopper when the header is attached to the frame, said opposed runs of the second pair of elements cooperatively exerting a rearwardly directed force on the gripped stalk at a point spaced vertically from the first pair of elements for ensuring the entire stalk moves rearwardly with the first pair of elements, said second pair of elements each comprising a chain carrying a plurality of spaced crop-engaging prongs, said prongs of the second pair of elements being spaced relatively further apart than the lugs of the first pair of elements.

42. A non-row-sensitive forage harvesting header for attachment to a mobile frame carrying a chopper for chopping severed stalks of crop received from the header, wherein said header comprises:

a cutter for severing the stalks as the frame moves across a field, said cutter adapted to be spaced forwardly of the chopper when the header is attached to the frame, a pair of generally cylindrical transfer devices rotatable about spaced upright axes for moving the severed stalks toward the chopper, each of said transfer devices including a circumferential sprocket;

a pair of driveable endless chains, each entraining the sprocket of a respective one of the transfer devices; and drive mechanism connectable to a power source and drivingly coupled with the chains such that the chains impart rotational movement to the transfer devices.

43. A non-row-sensitive harvesting header as claimed in claim 42, said chains presenting opposed rearwardly moveable runs extending between the transfer devices and the chopper when the header is attached to the frame, each of said chains carrying a plurality of spaced stalk-gripping lugs which become interdigitated with the lugs of the other chain along the opposed runs for clamping the stalks therebetween.

44. A non-row-sensitive harvesting header as claimed in claim 42, said transfer devices being driven in opposite directions.

45. A non-row-sensitive forage harvesting header for attachment to a mobile frame carrying a chopper for chopping severed stalks of crop received from the header, wherein said header comprises:

a pair of rotatable cutting discs for severing stalks as the frame moves across a field, said discs adapted to be spaced forwardly from the chopper when the header is attached to the frame;

a pair of drum-shaped transfer devices rotatable in opposite directions about spaced upright axes for gathering severed stalks to a central location between the devices;

a pair of endless gripping elements extending about respective ones of the transfer devices and presenting opposed rearwardly moveable runs extending between the central location and the chopper when the header is attached to the frame, said opposed runs of the gripping elements being operable to cooperatively grip each gathered stalk therebetween while moving the stalk rearwardly from the central location to the chopper, said gripping elements comprising endless chains, each of said transfer devices including a circumferential sprocket, each of said gripping elements entraining the sprocket of a respective one of the transfer devices.

46. A non-row-sensitive harvesting header as claimed in claim 45, and a drive mechanism connectable to a source of power and drivingly coupled with the gripping elements such that the elements impart rotational movement to the transfer devices.

47. A non-row-sensitive forage harvesting header for attachment to a mobile frame carrying a chopper for chopping severed stalks of crop received from the header, wherein said header comprises:

a pair of rotatable cutting discs for severing stalks as the frame moves across a field, said discs adapted to be spaced forwardly from the chopper when the header is attached to the frame;

a pair of drum-shaped transfer devices rotatable in opposite directions about spaced upright axes for gathering severed stalks to a central location between the devices;

a pair of endless gripping elements wrapping about respective ones of the transfer devices and presenting opposed rearwardly moveable runs extending between the central location and the chopper when the header is attached to the frame, said opposed runs of the gripping elements being operable to cooperatively grip each gathered stalk therebetween while moving the stalk rearwardly from the central location to the chopper.

48. A non-row-sensitive harvesting header as claimed in claim 47, said header including a pair of endless conveying elements extending about respective ones of the transfer devices and presenting opposed rearwardly moveable runs extending between the central location and the chopper when the header is attached to the frame, said opposed runs of the conveying elements being operable to cooperatively exert a rearwardly directed force on the gripped stalk at a point spaced upwardly from the gripping runs to ensure the entire stalk moves rearwardly.

49. A non-row-sensitive harvesting header as claimed in claim 47, each of said gripping elements including a plurality of spaced stalk-gripping lugs which become interdigitated with the lugs of the other gripping element along the opposed runs for clamping the gathered stalks therebetween.

50. A non-row-sensitive harvesting header as claimed in claim 47, said cutting discs having rotational axes coaxial with respective ones of the upright axes of the transfer devices.

51. A non-row-sensitive harvesting header as claimed in claim 50, each of said discs rotating in the same direction as respective ones of the transfer devices.

52. A forage harvester comprising:

a mobile frame;

a chopper carried on the frame for chopping severed stalks of crop; and a non-row-sensitive harvesting header carried on the frame to extend forwardly from the chopper, said header including:

a pair of rotatable cutting discs for severing stalks as the harvester moves across a field, a pair of drum-shaped transfer devices rotatable in opposite directions about spaced upright axes for gathering severed stalks to a central location between the devices, a pair of endless gripping elements wrapping about respective ones of the transfer devices and presenting opposed rearwardly moveable runs extending between the central location and the chopper, said opposed runs of the gripping elements being operable to cooperatively grip each gathered stalk therebetween while moving the stalk rearwardly from the central location to the chopper.

53. A forage harvester as claimed in claim 52, said header including a pair of endless conveying elements extending about respective ones of the transfer devices and presenting opposed rearwardly moveable runs extending between the central location and the chopper, said opposed runs of the conveying elements being operable to cooperatively exert a rearwardly directed force on the gripped stalk at a point spaced upwardly from the gripping runs to ensure the entire stalk moves rearwardly.

54. A forage harvester as claimed in claim 52, each of said gripping elements including a plurality of spaced stalk-gripping lugs which become interdigitated with the lugs of the other gripping element along the opposed runs for clamping the gathered stalks therebetween.

55. A forage harvester as claimed in claim 52, said cutting discs having rotational axes coaxial with respective ones of the upright axes of the transfer devices.

56. A forage harvester as claimed in claim 55, each of said discs rotating in the same direction as respective ones of the transfer devices.

57. A forage harvester as claimed in claim 52, said chopper having a forwardly facing inlet; and a knock down bar positioned above the conveying elements for engaging the stalks as they are moved rearwardly so that the stalks are presented to the inlet in a generally horizontal position.

58. A forage harvester as claimed in claim 52, said frame being self-propelled.

59. A forage harvester as claimed in claim 52, said frame including a tongue connectable to a towing vehicle.

60. A forage harvester comprising:

a mobile frame, a chopper carried on the frame for chopping severed stalks of crop; and a non-row-sensitive harvesting header carried on the frame to extend forwardly from the chopper, said header including:

a pair of rotatable cutting discs for severing stalks as the harvester moves across a field, a pair of drum-shaped transfer devices rotatable in opposite directions about spaced upright axes for gathering severed stalks to a central location between the devices, a pair of endless gripping elements extending about respective ones of the transfer devices and presenting opposed rearwardly moveable runs extending between the central location and the chopper, said opposed runs of the gripping elements being operable to cooperatively grip each gathered stalk therebetween while moving the stalk rearwardly from the central location to the chopper, said gripping elements comprising endless chains, each of said transfer devices including a circumferential sprocket, each of said gripping elements entraining the sprocket of a respective one of the transfer devices.

61. A forage harvester as claimed in claim 60; and a drive mechanism connectable to a source of power and drivingly coupled with the gripping elements such that the elements impart rotational movement to the transfer devices.

62. A non-row-sensitive forage harvesting header for attachment to a mobile frame carrying a chopper for chopping severed stalks of crop received from the header, wherein said header comprises:

a cutter for severing the stalks as the frame moves across a field, said cutter adapted to be spaced forwardly of the chopper when the header is attached to the frame, a pair of generally cylindrical transfer devices rotatable about spaced upright axes for gathering the severed stalks to a central location between the devices; and at least one pair of endless elements wrapping about respective ones of the devices and adapted to extend rearwardly toward the chopper, when the header is attached to the frame, for stripping stalks from the devices as the stalks are moved toward the chopper.

63. A non-row-sensitive harvesting header as claimed in claim 62, and a second pair of endless elements wrapping about respective ones of the devices and adapted to be rearwardly toward the chopper, when the header is attached to the frame, for stripping stalks from the devices as the stalks are moved toward the chopper.

64. A non-row-sensitive harvesting header as claimed in claim 63, said elements presenting opposed rearwardly moveable runs extending between the central location and the chopper, when the header is attached to the frame;

each of said elements of the one pair carrying a plurality of spaced stalk-gripping lugs which become interdigitated with the lugs of the other element along the opposed runs for clamping the stalks therebetween.

65. A non-row-sensitive harvesting header as claimed in claim 64, each of said elements of the second pair carrying a plurality of spaced crop-engaging prongs, said prongs of the second pair of elements being spaced relatively further apart than the lugs of the one pair of elements.

66. A harvesting header for attachment to a mobile frame carrying a stalk chopper having a forwardly facing inlet for receiving stalks of crop from the header, wherein said header comprises:

a cutter for severing stalks as the frame moves across a field, said cutter adapted to be spaced forwardly from the chopper when the header is attached to the frame;

transfer means for transferring the severed stalks to the chopper, said transfer means being operable to grip the stalks adjacent the severed ends thereof as the stalks are transferred by the transfer means, said transfer means also including a pair of auger members rotatable about laterally spaced, upright axes adjacent opposite sides of the chopper inlet when the header is attached to the frame, each of said members being operable to direct the stalks toward the chopper inlet and having flighting arranged to urge the stalks downwardly toward the severed ends of the stalks.

67. A harvesting header as claimed in claim 66, each of said members having a cylindrical shape.

68. A harvesting header as claimed in claim 66, said transfer means being row sensitive and including:

a plurality of pairs of crop gripping elements, each pair of gripping elements having a forwardmost inlet end for receiving a row of stalks, and further having a rearmost outlet end adapted to be adjacent the chopper inlet for delivery of the stalks directly to the inlet when the header is attached to the frame, said pairs of elements converging rearwardly such that the inlet ends are spaced laterally further apart than the outlet ends.

69. A harvesting header as claimed in claim 68, said transfer means including two of said pair of crop gripping elements.

70. A harvesting header as claimed in claim 68, said members extending upwardly from the gripping elements adjacent the outlet ends thereof, with the flighting of each of the members directing the stalks downwardly toward the gripping elements.

71. A harvesting header as claimed in claim 70, said plurality of pairs of gripping elements presenting outermost gripping elements adapted to project forwardly from the opposite sides of the chopper inlet when the header is attached to the frame, said auger members extending upwardly from respective ones of the outermost elements.

72. A harvesting header as claimed in claim 71, each of said members being rotated in the same direction as a respective one of the outermost elements.

73. A harvesting header as claimed in claim 72, each of said members including a stripping disc adjacent a respective one of the outermost elements for stripping stalks therefrom.

74. A harvesting header as claimed in claim 73, each of said outermost elements wrapping around a rear sprocket at the outlet end, said sprocket being coaxial with a respective one of the member axes, said conveying element at the sprocket and the disc having substantially similar radial dimensions.

75. A harvesting header for attachment to a mobile frame carrying a stalk chopper having a forwardly facing inlet for receiving stalks of crop from the header, wherein said header comprises:

a cutter for severing stalks as the frame moves across a field, said cutter adapted to be spaced forwardly from the chopper when the header is attached to the frame;

transfer means for transferring the severed stalks to the chopper.

said transfer means being operable to grin the stalks adjacent the severed ends thereof as the stalks are transferred to the chopper, said transfer means including a pair of auger members rotatable about laterally spaced, upright axes adjacent opposite sides of the chopper inlet when the header is attached to the frame, each of said members being operable to direct the stalks toward the chopper inlet and having flighting arranged to urge the stalks toward the severed ends of the stalks, said transfer means being non-row-sensitive and including:

a pair of drum-shaped devices rotatable in opposite directions about spaced upright axes for gathering severed stalks to a central location between the devices, a pair of endless gripping elements extending about respective ones of the transfer devices and presenting opposed rearwardly moveable runs adapted to extend between the central location and the chopper when the header is attached to the frame, said opposed runs of the gripping elements being operable to cooperatively grip each gathered stalk therebetween while moving the stalk rearwardly from the central location, and a pair of endless conveying elements extending about respective ones of the transfer devices and presenting opposed rearwardly moveable runs adapted to extend between the central location and the chopper when the header is attached to the frame, said opposed runs of the conveying elements being operable to cooperatively exert a rearwardly directed force on the gripped stalk at a point spaced upwardly from the gripping runs to ensure the entire stalk moves rearwardly.

76. A harvesting header as claimed in claim 75, said members extending vertically between respective ones of the gripping elements and conveying elements, with the flighting of each of the members directing the stalks downwardly toward the gripping elements.

77. A harvesting header as claimed in claim 76, each of said members being rotated in the same direction as respective ones of the gripping elements and conveying elements.

78. A harvesting header as claimed in claim 77, each of said members including a stripping disc adjacent a respective one of the conveying elements for stripping stalks therefrom.

79. A harvesting header for attachment to a mobile frame carrying a stalk chopper having a forwardly facing inlet for receiving stalks from the header, wherein said header comprises:

a cutter for severing stalks as the frame moves across a field, said cutter adapted to be spaced forwardly from the chopper when the header is attached to the frame;

transfer means for transferring the severed stalks to the chopper, said transfer means including a pair of auger members rotatable about laterally spaced, upright axes adjacent opposite sides of the chopper inlet when the header is attached to the frame, each of said members having flighting for directing the stalks toward the chopper inlet, said transfer means being non-row-sensitive and including:

a pair of drum-shaped devices rotatable in opposite directions about spaced upright axes for gathering severed stalks to a central location between the devices, a pair of endless gripping elements extending about respective ones of the transfer devices and presenting opposed rearwardly moveable runs adapted to extend between the central location and the chopper when the header is attached to the frame, said opposed runs of the gripping elements being operable to cooperatively grip each gathered stalk therebetween while moving the stalk rearwardly from the central location, and a pair of endless conveying elements extending about respective ones of the transfer devices and presenting opposed rearwardly moveable runs adapted to extend between the central location and the chopper when the header is attached to the frame, said opposed runs of the conveying elements being operable to cooperatively exert a rearwardly directed force on the gripped stalk at a point spaced upwardly from the gripping runs to ensure the entire stalk moves rearwardly, said members extending vertically between respective ones of the gripping elements and conveying elements, with the flighting of each of the members directing the stalks downwardly toward the gripping elements, each of said members being rotated in the same direction as respective ones of the gripping elements and conveying elements, each of said members including a stripping disc adjacent a respective one of the conveying elements for stripping stalks therefrom, each of said conveying elements wrapping around a rear sprocket coaxial with a respective one of the member axes, each of said conveying elements at the sprocket and the disc having substantially similar radial dimensions.

* * * * *